US010185955B1

(12) United States Patent
Koeppel et al.

(10) Patent No.: US 10,185,955 B1
(45) Date of Patent: Jan. 22, 2019

(54) ELECTRONIC WALLET DEVICE FOR BUSINESS TRANSACTIONS

(71) Applicant: Capital One Services, LLC, McLean, VA (US)

(72) Inventors: Adam Koeppel, Washington, DC (US); James Zarakas, Centreville, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/866,850

(22) Filed: Jan. 10, 2018

(51) Int. Cl.
*G06Q 20/10* (2012.01)
*G06Q 20/32* (2012.01)
*G06Q 20/36* (2012.01)
*G06Q 30/06* (2012.01)

(52) U.S. Cl.
CPC ....... *G06Q 20/3674* (2013.01); *G06Q 20/105* (2013.01); *G06Q 20/3278* (2013.01); *G06Q 30/06* (2013.01)

(58) Field of Classification Search
CPC ..................................................... G06Q 40/00
USPC ....................................................... 705/36 R
See application file for complete search history.

(56) References Cited

U.S. PATENT DOCUMENTS

| | | | | |
|---|---|---|---|---|
| 5,953,710 A * | 9/1999 | Fleming | ................ | G06Q 20/04 235/380 |
| 6,685,088 B1 * | 2/2004 | Royer | .................... | G06Q 20/04 235/380 |
| 6,755,342 B1 * | 6/2004 | Jordan, Jr. | ............. | G06Q 20/04 235/380 |
| 6,993,510 B2 * | 1/2006 | Guy | ....................... | G06Q 20/04 705/68 |
| 7,003,316 B1 * | 2/2006 | Elias | ...................... | G06Q 20/20 455/11.1 |
| 7,086,586 B1 * | 8/2006 | Sullivan | ................. | G06Q 20/10 235/379 |
| 7,137,552 B1 * | 11/2006 | Lasch | .................... | G06K 19/04 235/380 |
| 7,400,883 B2 * | 7/2008 | Rivers | .................. | G06Q 20/108 455/412.1 |
| 7,445,155 B2 * | 11/2008 | Ramachandran | .... | G06K 7/0004 235/379 |
| 7,581,678 B2 * | 9/2009 | Narendra | ......... | G06K 19/06187 235/380 |
| 7,631,803 B2 * | 12/2009 | Peyret | .................... | G06Q 20/10 235/380 |
| 7,757,944 B2 * | 7/2010 | Cline | .................... | G06Q 20/10 235/375 |
| 7,840,456 B2 | 11/2010 | Patzer | | |

(Continued)

*Primary Examiner* — Kirsten S Apple
(74) *Attorney, Agent, or Firm* — Harrity & Harrity, LLP

(57) ABSTRACT

An example device may include a plurality of card slots configured to hold at least two transaction cards, each card slot, of the plurality of card slots, including a card reader, one or more memories; and one or more processors, communicatively coupled to the one or more memories, to receive transaction information associated with a transaction at a transaction terminal; identify business information associated with the transaction; select a transaction card from the at least two transaction cards based on the transaction information and the business information; and provide a transaction token, associated with the selected transaction card, to be used in connection with the transaction terminal to process the transaction.

20 Claims, 18 Drawing Sheets

(56) References Cited

U.S. PATENT DOCUMENTS

| | | | |
|---|---|---|---|
| 7,860,790 B2* | 12/2010 | Monk | G06Q 20/10 705/35 |
| 7,925,285 B2* | 4/2011 | Indirabhai | H04W 56/00 370/338 |
| 7,980,458 B2* | 7/2011 | Kon | G06Q 20/042 235/375 |
| D651,237 S | 12/2011 | Mullen et al. | |
| D651,238 S | 12/2011 | Mullen et al. | |
| D651,644 S | 1/2012 | Mullen et al. | |
| D652,075 S | 1/2012 | Mullen et al. | |
| D652,076 S | 1/2012 | Mullen et al. | |
| D652,448 S | 1/2012 | Mullen et al. | |
| D652,449 S | 1/2012 | Mullen et al. | |
| D652,450 S | 1/2012 | Mullen et al. | |
| D652,867 S | 1/2012 | Mullen et al. | |
| D653,063 S | 1/2012 | Post et al. | |
| D653,288 S | 1/2012 | Mullen et al. | |
| D665,022 S | 8/2012 | Mullen et al. | |
| D665,447 S | 8/2012 | Mullen et al. | |
| D666,241 S | 8/2012 | Mullen et al. | |
| D670,329 S | 11/2012 | Mullen et al. | |
| D670,330 S | 11/2012 | Mullen et al. | |
| D670,331 S | 11/2012 | Mullen et al. | |
| D670,332 S | 11/2012 | Mullen et al. | |
| D670,759 S | 11/2012 | Mullen et al. | |
| D672,389 S | 12/2012 | Mullen et al. | |
| D673,606 S | 1/2013 | Mullen et al. | |
| D674,013 S | 1/2013 | Mullen et al. | |
| D675,256 S | 1/2013 | Mullen et al. | |
| D676,487 S | 2/2013 | Mullen et al. | |
| D676,904 S | 2/2013 | Mullen et al. | |
| D687,094 S | 7/2013 | Mullen et al. | |
| D687,095 S | 7/2013 | Mullen et al. | |
| D687,487 S | 8/2013 | Mullen et al. | |
| D687,488 S | 8/2013 | Mullen et al. | |
| D687,489 S | 8/2013 | Mullen et al. | |
| D687,490 S | 8/2013 | Mullen et al. | |
| D687,887 S | 8/2013 | Mullen et al. | |
| D688,744 S | 8/2013 | Mullen et al. | |
| D692,053 S | 10/2013 | Mullen et al. | |
| 9,881,306 B2* | 1/2018 | Gannon | G06Q 20/405 |
| 2001/0047336 A1 | 11/2001 | Maycock, Jr. et al. | |
| 2002/0065774 A1* | 5/2002 | Young | G06Q 20/02 705/41 |
| 2002/0174016 A1* | 11/2002 | Cuervo | G06Q 20/00 705/16 |
| 2003/0172039 A1* | 9/2003 | Guy | G06Q 20/04 705/68 |
| 2004/0104268 A1* | 6/2004 | Bailey | G06Q 20/32 235/439 |
| 2004/0236693 A1* | 11/2004 | Quesselaire | G06Q 20/341 705/50 |
| 2005/0021457 A1* | 1/2005 | Johnson | G06Q 20/04 705/39 |
| 2005/0171898 A1* | 8/2005 | Bishop | G06Q 20/00 705/39 |
| 2006/0018450 A1* | 1/2006 | Sandberg-Diment | G06Q 20/20 379/93.12 |
| 2007/0017976 A1* | 1/2007 | Peyret | G06Q 20/10 235/380 |
| 2007/0057038 A1* | 3/2007 | Gannon | G06Q 20/20 235/380 |
| 2007/0162369 A1* | 7/2007 | Hardison, III | G06Q 20/10 705/35 |
| 2007/0174166 A1* | 7/2007 | Jones | G06Q 30/02 705/35 |
| 2007/0226793 A1* | 9/2007 | Tanabiki | H04L 9/0825 726/21 |
| 2007/0262140 A1* | 11/2007 | Long, Sr. | G06Q 20/04 235/380 |
| 2009/0281941 A1* | 11/2009 | Worth | G06Q 20/10 705/39 |
| 2009/0281951 A1* | 11/2009 | Shakkarwar | G06Q 20/04 705/67 |
| 2010/0063906 A1* | 3/2010 | Nelsen | G06Q 20/28 705/30 |
| 2010/0076833 A1* | 3/2010 | Nelsen | G06Q 20/06 705/14.25 |
| 2010/0088188 A1* | 4/2010 | Kumar | G06Q 20/10 705/17 |
| 2011/0022472 A1* | 1/2011 | Zon | G06Q 20/10 705/14.64 |
| 2012/0185378 A1* | 7/2012 | Liu | G06Q 20/04 705/39 |
| 2015/0161591 A1* | 6/2015 | Yang | G06Q 20/3278 235/379 |
| 2017/0103384 A1* | 4/2017 | Gannon | G06Q 20/353 |

* cited by examiner

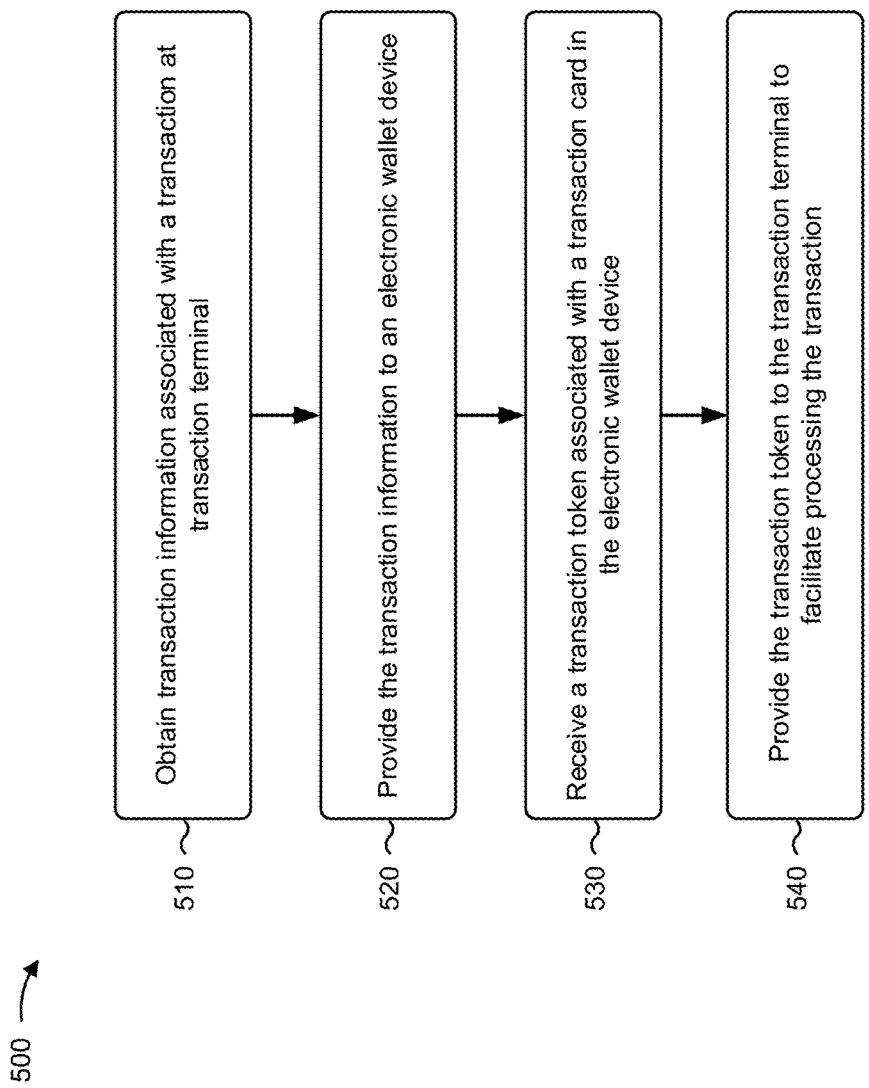

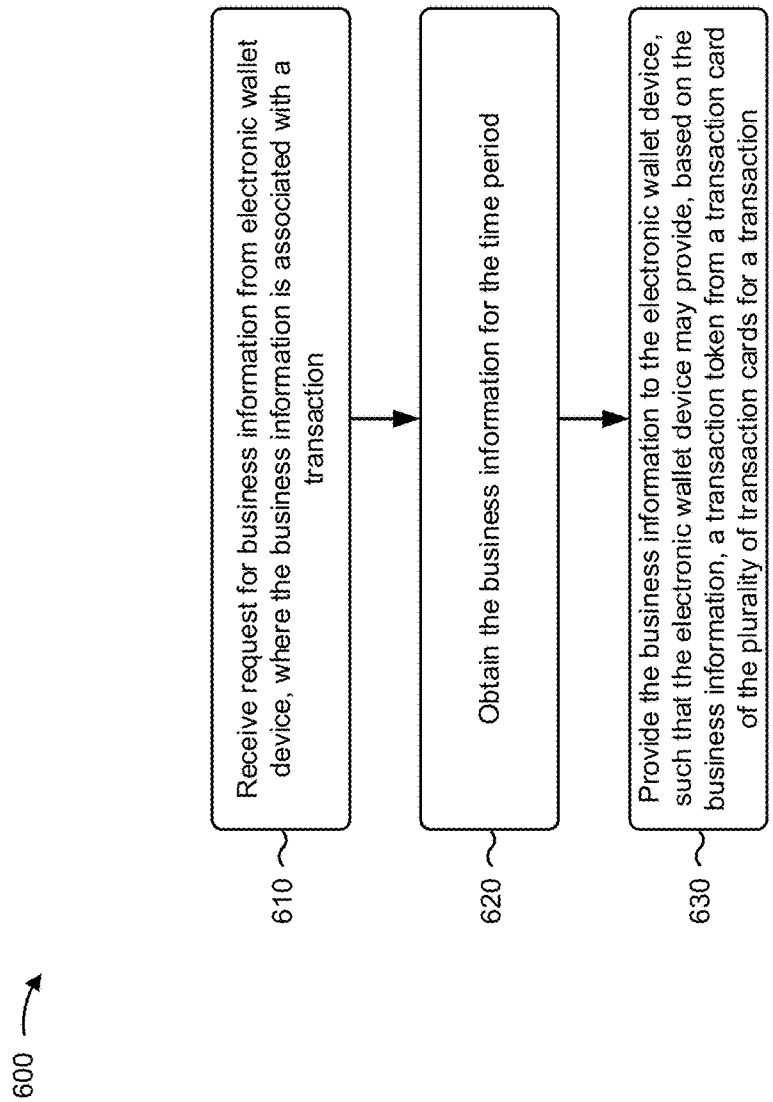

US 10,185,955 B1

ELECTRONIC WALLET DEVICE FOR BUSINESS TRANSACTIONS

BACKGROUND

Transaction cards (e.g., credit cards, debit cards, gift cards, automated teller machine (ATM) cards, rewards cards or client loyalty cards, and/or the like) and/or devices (e.g., a smart transaction card, a smartphone, and/or the like) may be used in transactions to pay for products or services at transaction terminals (e.g., point of sale (PoS) terminals) of individuals or businesses engaged in the sale of goods or services. The transaction cards may include an integrated circuit (IC) chip to improve security with respect to use of the transaction card. Utilizing such "chip cards" requires physically inserting the cards into a card reader. The integrated circuits may include a secure element, which is required in order to validate and/or authenticate a transaction utilizing the chip card. Newer card readers may use contactless technologies, such as near field communication (NFC) or Bluetooth Low Energy (BLE) technologies and/or the like, to allow communications between the transaction terminal and a transaction card, with attendant advantages. Many existing chip cards are not compatible with such contactless payment terminals.

SUMMARY

According to some implementations, an electronic wallet device may include a plurality of card slots configured to hold at least two transaction cards, each card slot, of the plurality of card slots, including a card reader, one or more memories; and one or more processors, communicatively coupled to the one or more memories, to receive transaction information associated with a transaction at a transaction terminal; identify business information associated with the transaction; select a transaction card from the at least two transaction cards based on the transaction information and the business information; and provide a transaction token, associated with the selected transaction card, to be used in connection with the transaction terminal to process the transaction.

According to some implementations, a non-transitory computer-readable medium storing instructions, that, when executed by one or more processors of an electronic wallet device, may cause the one or more processors to receive transaction information associated with a transaction at a transaction terminal; identify business information associated with a time period of the transaction; identify a set of candidate transaction cards to be used for the transaction, the set of candidate transaction cards comprising respective integrated circuit (IC) chips that are communicatively coupled with a card reader of the electronic wallet device; select a transaction card from the set of candidate transaction cards, the transaction card being selected based on the business information; and provide a transaction token, associated with the transaction card, to the transaction terminal.

According to some implementations, a method may include detecting, by an electronic wallet device, a transaction pending at a transaction terminal, the electronic wallet device holding at least two transaction cards; obtaining, by the electronic wall device, business information associated with a time period of the transaction; selecting, by the electronic wallet device, a transaction card from the at least two transaction cards, the transaction card being selected based on at least one of: the business information, or transaction information associated with the transaction; obtaining, by the electronic wallet device, a transaction token associated with the transaction card; and providing, by the electronic wallet device, the transaction token to the transaction terminal.

BRIEF DESCRIPTION OF THE DRAWINGS

FIG. 5 is a flow chart of an example process that may be implemented in association with a smart transaction card and an electronic wallet device described herein;

FIG. 6 is a flow chart of an example process that may be implemented in association with a user device and an electronic wallet device described herein;

DETAILED DESCRIPTION

Figure 1A:
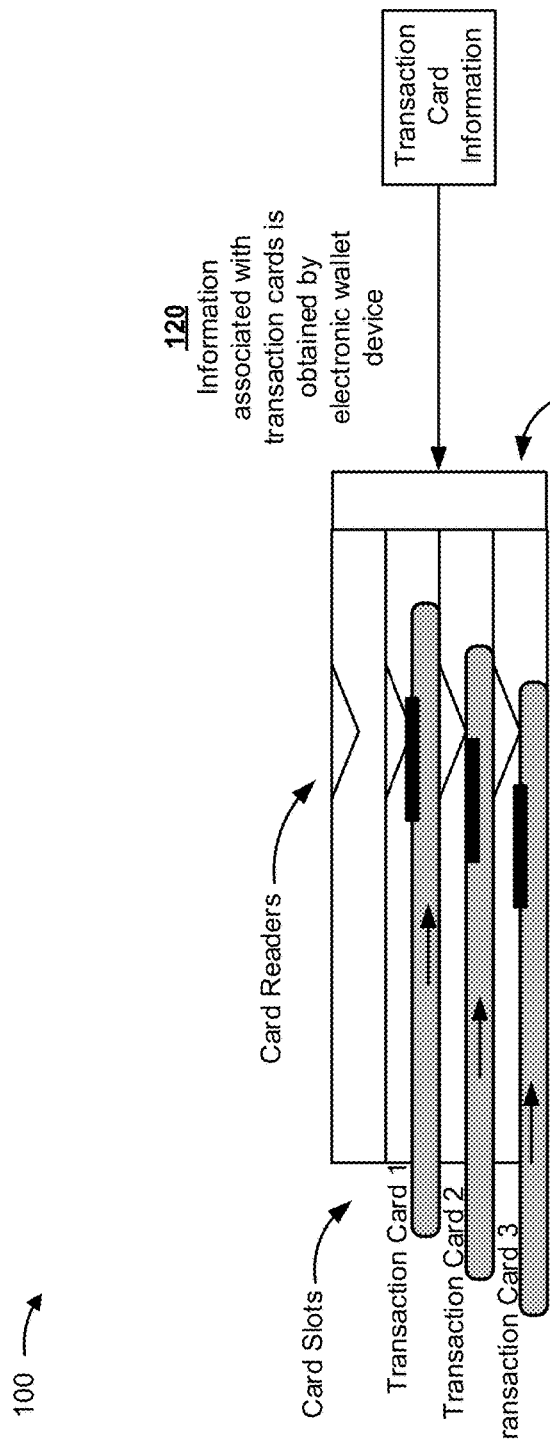
FIGS. 1A-1C are diagrams of an overview of an example implementation described herein.

The following detailed description of example implementations refers to the accompanying drawings. The same reference numbers in different drawings may identify the same or similar elements.

Transaction cards may be used to facilitate processing transactions at transaction terminals (e.g., point of sale (PoS) terminals, automated teller machine (ATM) terminals, access terminals (e.g., locking mechanisms for gates, doors, rooms, and/or the like), reward redemption terminals, and/or the like). In many instances, consumers may have accounts with multiple entities (e.g., financial institutions (e.g., banks), merchants, card associations, and/or the like) and/or may have accounts for multiple purposes (e.g., business purposes, specific types of business purposes, personal purposes, and/or the like). Accordingly, consumers may carry multiple transaction cards while utilizing the transaction cards in transactions (e.g., purchasing goods or services, redeeming loyalty/rewards points, redeeming store credit/gift cards, and/or the like). In some instances, consumers may prefer to use particular cards for particular goods or services of a transaction based on business uses associated with the transaction cards (e.g., expensing transactions, inventory purchases, and/or the like) and/or transaction information associated with the transaction (e.g., merchant identifier indicating a type of merchant involved in the transaction, a monetary value of the transaction, location information corresponding to a location of the transaction, a currency used in the transaction, and/or the like).

Some implementations, disclosed herein, provide an electronic wallet device to facilitate processing transactions at a transaction terminal (e.g., a point of sale (PoS) terminal). The electronic wallet device may receive transaction cards (e.g., by a user inserting the transaction cards into card slots of the electronic wallet device) that may be used in the transactions. The electronic wallet device may allow communication of a transaction token from one or more of the transaction cards to the transaction terminal to facilitate the transaction, either directly or indirectly. In some implementations, the electronic wallet device may select a transaction card from a plurality of transaction cards inserted into the electronic wallet device to communicate a transaction token to the transaction terminal for the transaction based on transaction information associated with the transaction terminal, based on business information associated with the transaction or transaction card, based on user input, and/or the like.

Accordingly, some implementations described herein enable consumers to utilize a single device (i.e., an electronic wallet device) to facilitate transactions between transaction terminals and a plurality of transaction cards (e.g., rather than the consumer individually selecting and physically using the transaction cards at the transaction terminals). For example, the electronic wallet device may provide or communicate transaction tokens associated with the transactions cards to transaction terminals without consumers removing the transaction cards from the electronic wallet device. Furthermore, some implementations herein may enable automatic selection of an appropriate transaction card based on transaction information associated with the transaction and/or transaction terminal (e.g., merchant type, transaction type, monetary value of transaction, location information corresponding to a location of transaction, and/or the like) and/or business information associated with the transaction (e.g., calendar information associated with the transaction, message information associated with the transaction, authorization information for the transaction, and/or the like). Further, some implementations herein may provide an enhanced experience for consumers when engaging in transactions by enabling consumers to avoid selecting a transaction card to be used that ultimately may cause a consumer to use a personal card rather than a business card, perhaps resulting in an inability to expense a transaction. Additionally, consumers, using an electronic wallet device described herein, may avoid shuffling through multiple transaction cards and/or personal items to find a business transaction card for a business transaction and/or a personal transaction card for a personal transaction. According to some implementations, transaction errors or failures may be avoided using an electronic wallet device as the electronic wallet device may avoid selecting or using transaction cards, for a transaction, that may be declined (e.g., by determining that a particular transaction may result in credit limits of accounts of the transaction cards to be reached or exceeded), thus saving network resources and/or transaction terminal resources.

Figure 1B:
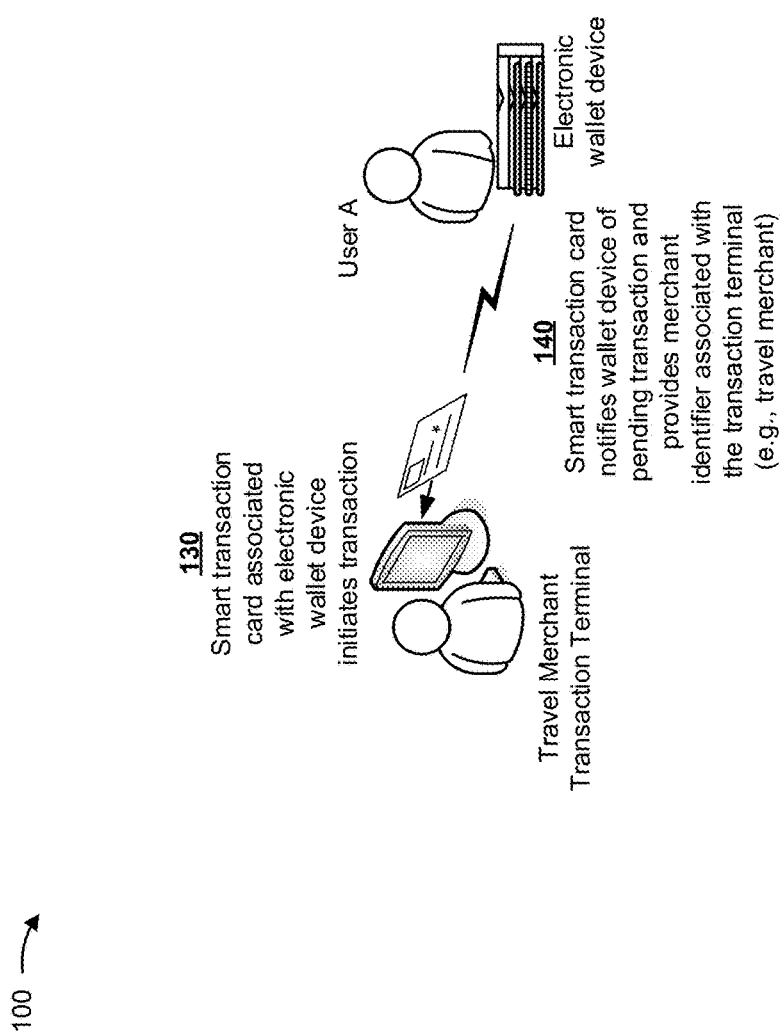
Figure 1C:
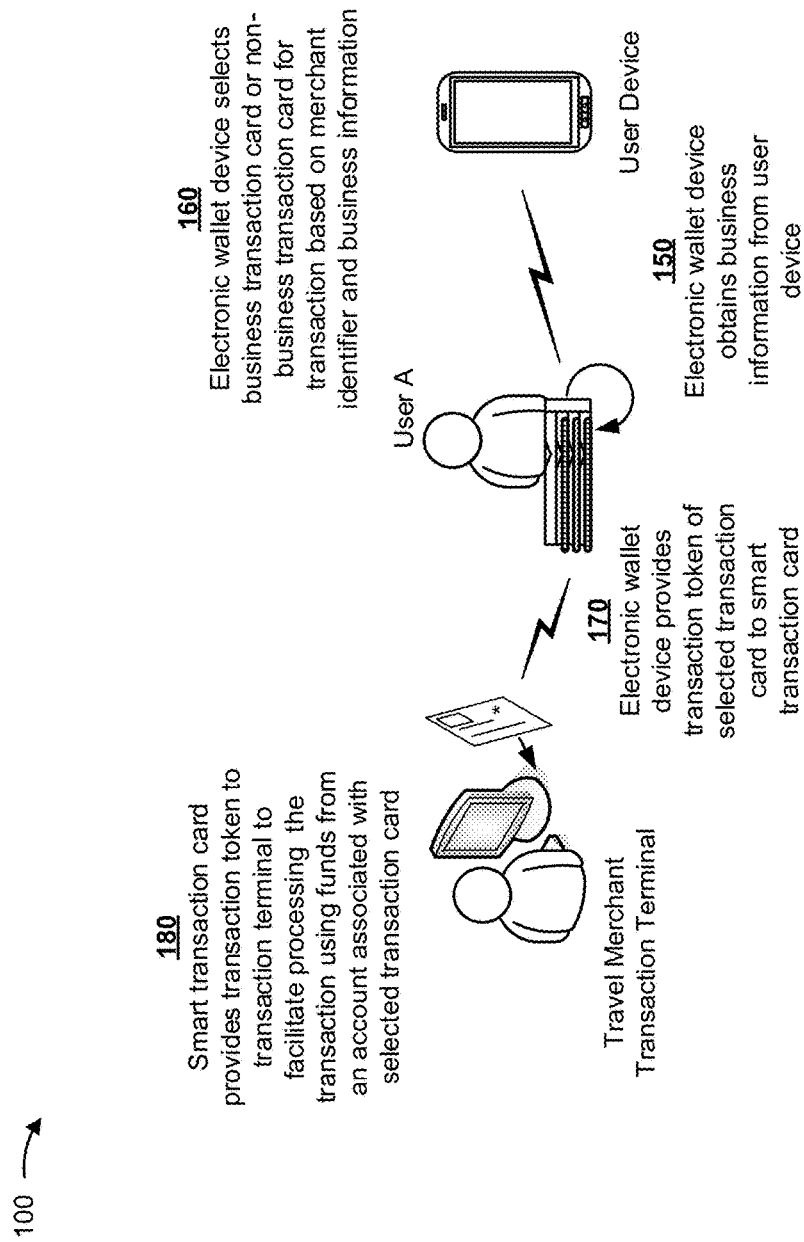

FIGS. 1A-1C are diagrams of an overview of an example implementation 100 described herein. In example implementation 100 of FIGS. 1A-1C an electronic wallet device is used in a transaction with a transaction terminal. In FIGS. 1A-1C, the electronic wallet device holds transaction cards that may be used in the transaction without being removed from the electronic wallet device.

As shown in FIG. 1A, and by reference number 110, the transaction cards 1-3 are inserted into the electronic wallet device. For example, a consumer may insert the transaction cards into card slots of the electronic device by sliding the transaction cards into the card slots until integrated circuit (IC) chips (e.g., a EUROPAY®, MASTERCARD®, VISA® (EMV) chip) of the transaction cards are in electrical contact with contacts of the electronic wallet device. As shown by reference number 120, information associated with the transaction cards may be obtained by the electronic wallet device. For example, a hub of the electronic wallet device may obtain card information and/or business information associated with the transaction card. More specifically, the hub may obtain balance information associated with an account of the transaction card, credit limit information associated with an account of the transaction card, information indicating that the transaction card is to be used for business transactions, information indicating that the transaction card is not to be used for business transactions, information associated with one or more spend thresholds (e.g., per diems) of the transaction card, and/or the like. In some implementations, the electronic wallet device of example implementation 100 may obtain the information from a user input, from a device in communication with the electronic wallet device (e.g., a computer, a smartphone, and/or the like), via a network accessible to the device, and/or the like. In some implementations, the electronic wallet device may store the information associated with the transaction cards in the hub (e.g., in a data store of the hub).

As shown in FIG. 1B, and by reference number 130, a smart transaction card associated with the electronic wallet device may be used to facilitate processing a transaction at a travel merchant transaction terminal. For example, the smart transaction card may be associated with the electronic wallet device by being communicatively coupled with the electronic wallet device (e.g., via a wired or wireless communication link, such as a Bluetooth communication link, a Bluetooth low energy (BLE) communication link, a Wi-Fi communication link, and/or the like). The smart transaction card may engage in the transaction via an integrated circuit (IC) chip of the smart transaction card (e.g., by being inserted into a card reader of the transaction terminal), via a magnetic strip of the smart transaction card (e.g., by being swiped), via a radio frequency (RF) antenna (e.g., via a near field communication (NFC) with the transaction terminal), and/or the like. As shown by reference number 140, the smart transaction card notifies the electronic wallet device of the pending transaction (e.g., via a transaction notification message) and provides a merchant identifier associated with the transaction terminal. For example, the smart transaction card may provide a merchant identifier indicating that the transaction is with a transaction merchant.

As shown in FIG. 1C, and by reference number 150, the electronic wallet device obtains business information from a user device. The user device may be communicatively coupled (e.g., via a wired or wireless communication link, such as a Bluetooth communication link, a Bluetooth low energy (BLE) communication link, a Wi-Fi communication link, and/or the like) with the user device to obtain the business information. Such business information may include calendar information (e.g., from a calendar application the user device), message information (e.g., from a messaging application of the user device), authorization information (e.g., from an application associated with the electronic wallet indicating allowable business transactions (e.g., based on merchant identifier, based on timing, based on geographical location, and/or the like)), location information, and/or the like.

As shown by reference number 160, the electronic wallet device may select a business transaction card or non-business transaction card (e.g., a personal transaction card) for the transaction from transaction cards 1-3. For example, because the merchant identifier of the transaction indicates that the transaction is with a travel merchant (which may commonly be an expensable business transaction), the electronic wallet device may determine whether the business information from the user device indicates travel plans associated with a business. For example, a business calendar of a consumer of the electronic wallet device and/or user device may indicate that that the user is to be traveling at the time of the transaction. As such, the electronic wallet device may select a business transaction card from transaction cards 1-3 (e.g., one of transaction cards 1-3 that may be designated as a business transaction card). On the other hand, if the business information from user device does not indicate business related travel at or near the time of the transaction, the electronic wallet may select a non-business transaction card from the transaction cards 1-3 in the electronic wallet device.

As further shown in FIG. 1C, and by reference number 170, the electronic wallet device communicates the transaction token of the selected transaction card to the smart transaction card. For example, the electronic wallet device may communicate the transaction token via a communication link with the smart transaction card. As shown by reference number 180, the smart transaction card provides the transaction token to the transaction terminal to facilitate processing the transaction using funds from an account associated with the selected transaction card.

As illustrated in example implementation 100 of FIGS. 1A-1C, User A, when purchasing travel arrangements at a transaction terminal, may utilize an electronic wallet to provide a transaction token from a transaction card of the electronic wallet. Furthermore, the electronic wallet device may effectively select an appropriate transaction card for the transaction based on business information associated with User A and/or the transaction as indicated by the merchant identifier. Accordingly, User A may have an enjoyable transaction experience without needing to determine which transaction card is to be used for a particular transaction or having to shuffle through User A's multiple transaction cards or personal items to find an appropriate business transaction card or non-business transaction card.

As indicated above, FIGS. 1A-1C are provided merely as an example. Other examples are possible and may differ from what was described with regard to FIGS. 1A-1C.

Figure 2:
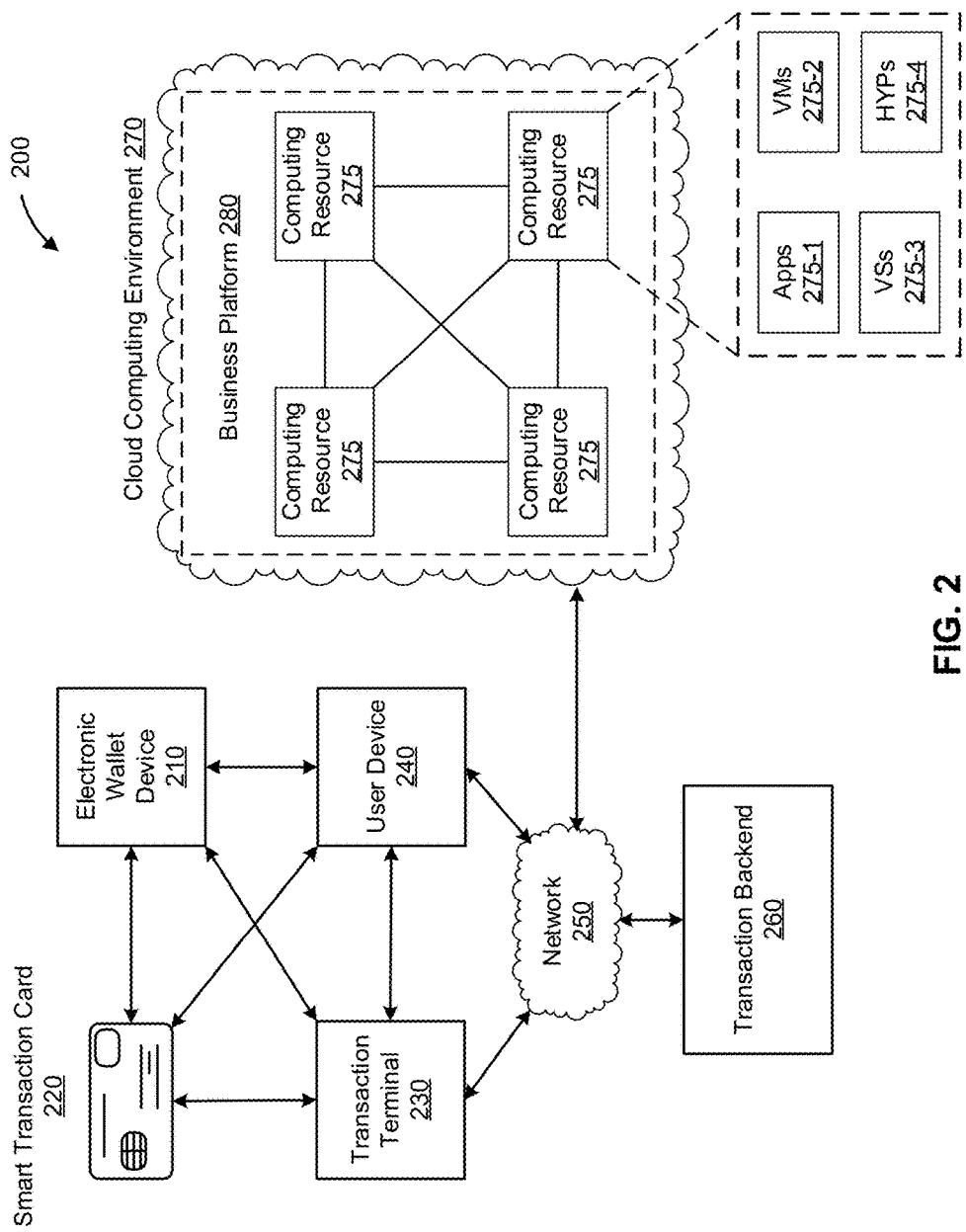
FIG. 2 is a diagram of an example environment in which systems and/or methods, described herein, may be implemented.

FIG. 2 is a diagram of an example environment in which systems and/or methods, described herein, may be implemented. As shown in FIG. 2, environment 200 may include an electronic wallet device 210, a smart transaction card 220, a transaction terminal 230, a user device 240, a network 250, a transaction backend 260, and a cloud computing environment 270 that hosts a business platform 280. In environment 200, electronic wallet device 210, smart transaction card 220, transaction terminal 230, and/or user device 240 may communicate data, between one another, that is associated with or related to a transaction with transaction terminal 230, which facilitates processing the transaction through communication with transaction backend 260 via network 250. Devices of environment 200 may interconnect via wired connections, wireless connections, or a combination of wired and wireless connections.

Electronic wallet device 210 includes a device that may receive or dock transaction cards (e.g., credit cards, debit cards, access cards, client loyalty cards, gift cards, and/or the like). Electronic wallet device 210 may include one or more card slots configured to hold the transaction cards. Each card slot, of the one or more card slots, may include a card reader (e.g., a chip reader). Electronic wallet device 210 may include a switching component that enables electronic wallet device 210 to obtain transaction tokens and/or information (e.g., card identification information) from transaction cards in electronic wallet device 210 and/or provide the transaction tokens and/or information to components of environment 200. An example switching component may include a conductive link (e.g., a trace, a wired connection, and/or the like) and/or one or more switches. In some implementations, electronic wallet device 210 may include a hub with a processor and/or a communication interface (e.g., a Bluetooth interface, BLE interface, a Wi-Fi interface, a NFC interface, a cellular communication interface, and/or the like). For example, the hub may facilitate communication between electronic wallet device 210 and the components of environment 200. In some implementations, electronic wallet device 210 may be modular in that components of electronic wallet device 210 (e.g., card slots, a hub, a switching component, and/or the like) may be added and/or removed from electronic wallet device 210 to enable electronic wallet device 210 to be adjustable and/or to hold more or less transaction cards, to increase or decrease the functionality of electronic wallet device 210, and/or the like.

Smart transaction card 220 includes a transaction card capable of communicating with the components of environment 200 (e.g., via Bluetooth communication, BLE communication, Wi-Fi communication, NFC session, and/or the like). Smart transaction card 220 is capable of communicating data for a transaction with transaction terminal 230. For example, smart transaction card 220 may communicate data including a transaction token, transaction card identification information (e.g., an account identifier, a cardholder identifier, and/or the like), account information, banking information, transaction information (e.g., a transaction token), and/or the like associated with transaction cards held in electronic wallet device 210. For example, to communicate the data, smart transaction card 220 may include a magnetic strip and/or an integrated circuit (IC) chip (e.g., a EUROPAY®, MASTERCARD®, VISA® (EMV) chip). Smart transaction card 220 may include an antenna to communicate data associated with smart transaction card 220. The antenna may be a passive RF antenna, an active RF antenna, and/or a battery-assisted RF antenna.

In some implementations, smart transaction card 220 may communicate data associated with transaction terminal 230 to electronic wallet device 210 and/or user device 240. For example, after an interaction with transaction terminal 230 that may engage in a transaction (e.g., after smart transaction card 220 is swiped through a magnetic strip reader, after smart transaction card 220 is inserted into a card reader of transaction terminal 230, after smart transaction card 220 has an NFC session with transaction terminal 230, and/or the like), smart transaction card 220 may obtain transaction information from transaction terminal 230. For example, transaction terminal 230 may obtain and/or provide transaction information including information associated with an entity that owns or operates the transaction terminal, such as a merchant identifier, acceptable forms of payment, acceptable types of transaction cards, a monetary value associated with the transaction (e.g., an amount or value of funds to be exchanged in the transaction), a location information corresponding to a location of the transaction (e.g., a geographical region, country, and/or the like), and/or the like. Such transaction information may be used by electronic wallet device 210 to select a transaction card (and/or an account associated with a transaction card) held in electronic wallet device 210 that is to be used in the transaction (e.g., by providing a transaction token to transaction terminal 230).

Transaction terminal 230 includes one or more devices capable of receiving, generating, storing, processing, and/or providing information associated with facilitating a transaction (a PoS transaction). For example, transaction terminal 230 may include a communication device and/or computing device capable of receiving data from smart transaction card 220 and/or a transaction card of electronic wallet device 210 and processing a transaction based on the data. In some implementations, transaction terminal 230 may include a desktop computer, a laptop computer, a tablet computer, a handheld computer, and/or a mobile phone (e.g., a smart phone, a radiotelephone, and/or the like). Transaction terminal 230 may be owned and/or operated by one or more individuals or businesses engaged in a sale of goods or services (e.g., one or more merchants, vendors, service providers, and/or the like). In some implementations, after an interaction with smart transaction card 220 and/or a transaction card, transaction terminal 230 may provide or indicate transaction information associated with a transaction to smart transaction card 220 and/or the transaction card. For example, transaction terminal 230 may indicate a merchant identifier, acceptable forms of payment for the transaction, acceptable types of transaction cards that may be used in the transaction, a monetary value associated with the transaction, a currency used in the transaction, location information corresponding to a location of the transaction, and/or the like.

Transaction terminal 230 includes one or more devices to facilitate processing a transaction via a transaction card and/or smart transaction card 220. Transaction terminal 230 may include a PoS terminal, a security access terminal, an ATM terminal, and/or the like. Transaction terminal 230 may include one or more input devices and/or output devices to facilitate obtaining transaction card data from smart transaction card 220 and/or from an interaction or authorization from a cardholder of smart transaction card 220. Example input devices of transaction terminal 230 may include a number keypad, a touchscreen, a magnetic strip reader, a chip reader, and/or an RF signal reader. A magnetic strip reader of transaction terminal 230 may receive transaction card data as a magnetic strip of smart transaction card 220 is swiped along the magnetic strip reader. A chip reader of transaction terminal 230 may receive transaction card data from an IC chip (e.g., an EMV chip) of smart transaction card 220 when the chip is communicatively coupled with the chip reader. An RF signal reader of transaction terminal 230 may enable contactless transactions from smart transaction card 220 by obtaining transaction card data wirelessly from smart transaction card 220 as smart transaction card 220 comes within a range of transaction terminal 230 that the RF signal reader may detect an RF signal from an RF antenna of smart transaction card 220. Example output devices of transaction terminal 230 may include a display device, a speaker, a printer, and/or the like.

User device 240 includes one or more devices capable of receiving, generating, storing, processing, and/or providing information associated with facilitating a transaction using transaction cards of electronic wallet device 210 in accordance with some implementations herein. For example, user device 240 may include a communication and/or computing device, such as a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), or a similar type of device. In some implementations, user device 240 may be configured to communicate with electronic wallet device 210 to provide business information associated with a consumer and/or a time period of a transaction.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Transaction backend 260 includes one or more devices capable of authorizing and/or facilitating a transaction. For example, transaction backend 260 may include one or more servers and/or computers to store and/or provide information (e.g., authorizations, balances, transaction tokens, security information, account information, and/or the like) associated with processing a transaction via transaction terminal 230.

Transaction backend 260 may include one or more devices associated with financial institutions (e.g., banks, credit unions, and/or the like) and/or transaction card associations that authorize the transaction and/or facilitate a transfer of funds or payments between an account of a cardholder of smart transaction card 220 and an account of an individual or business of transaction terminal 230. For example, transaction backend 260 may include one or more devices of one or more issuing financial institutions associated with a cardholder of transaction cards in electronic wallet device 210, one or more devices of one or more acquiring financial institutions (or merchant banks) associated with transaction terminal 230, and/or one or more devices associated with one or more card associations (e.g., VISA®, MASTERCARD®, and/or the like) associated with transaction cards of electronic wallet device 210. Accordingly, in response to receiving transaction card data associated with transaction cards of electronic wallet device 210 from transaction terminal 230, various financial institutions and/or card associations of transaction backend 260 may communicate to authorize the transaction and/or transfer funds between the accounts associated with transaction cards of electronic wallet device 210 and/or transaction terminal 230.

Transaction backend 260 may include one or more devices associated with a rewards program associated with transaction cards in electronic wallet device 210 and/or an entity (e.g., a bank, a merchant, a service provider, a vendor, and/or the like) associated with transaction cards in electronic wallet device 210 and/or an entity associated with transaction terminal 230. For example, transaction backend 260 may authorize earning and/or redeeming of rewards (e.g., rewards points associated with transaction cards in electronic wallet device 210, cash rewards, client loyalty rewards associated with an entity associated with transaction terminal 230, and/or the like) based on a transaction processed by transaction terminal 230 with smart transaction card 220 and/or transaction cards in electronic wallet device 210.

Cloud computing environment 270 includes an environment that delivers computing as a service, whereby shared resources, services, etc. may be provided to electronic wallet device 210, smart transaction card 220, and/or user device 240. Cloud computing environment 270 may provide computation, software, data access, storage, and/or other services that do not require end-user knowledge of a physical location and configuration of a system and/or a device that delivers the services. As shown, cloud computing environment 270 may include computing resource 275.

Computing resource 275 includes one or more personal computers, workstation computers, server devices, or another type of computation and/or communication device. In some implementations, computing resource 275 may host business platform 280. The cloud resources may include compute instances executing in computing resource 275, storage devices provided in computing resource 275, data transfer devices provided by computing resource 275, etc. In some implementations, computing resource 275 may communicate with other computing resources 275 via wired connections, wireless connections, or a combination of wired and wireless connections.

As further shown in FIG. 2, computing resource 275 may include a group of cloud resources, such as one or more applications ("APPs") 275-1, one or more virtual machines ("VMs") 275-2, virtualized storage ("VSs") 275-3, one or more hypervisors ("HYPs") 275-4, or the like.

Application 275-1 includes one or more software applications that may be provided to or accessed by user device 240. Application 275-1 may eliminate a need to install and execute the software applications on user device 240. For example, application 275-1 may include software associated with business platform 280 and/or any other software capable of being provided via cloud computing environment 270. In some implementations, one application 275-1 may send/receive information to/from one or more other applications 275-1, via virtual machine 275-2.

Virtual machine 275-2 includes a software implementation of a machine (e.g., a computer) that executes programs like a physical machine. Virtual machine 275-2 may be either a system virtual machine or a process virtual machine, depending upon use and degree of correspondence to any real machine by virtual machine 275-2. A system virtual machine may provide a complete system platform that supports execution of a complete operating system ("OS"). A process virtual machine may execute a single program, and may support a single process. In some implementations, virtual machine 275-2 may execute on behalf of a user (e.g., user device 240), and may manage infrastructure of cloud computing environment 270, such as data management, synchronization, or long-duration data transfers.

Virtualized storage 275-3 includes one or more storage systems and/or one or more devices that use virtualization techniques within the storage systems or devices of computing resource 275. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 275-4 provides hardware virtualization techniques that allow multiple operating systems (e.g., "guest operating systems") to execute concurrently on a host computer, such as computing resource 275. Hypervisor 275-4 may present a virtual operating platform to the guest operating systems, and may manage the execution of the guest operating systems. Multiple instances of a variety of operating systems may share virtualized hardware resources.

Business platform 280 includes one or more devices capable of receiving, generating, storing, processing, and/or providing information associated with maintaining business information (e.g., business information associated with a consumer associated with electronic wallet device 210). Business platform 280 may include a server device or a group of server devices. Business platform 280 may be hosted in cloud computing environment 270. Notably, while implementations described herein describe business platform as being hosted in cloud computing environment 270, in some implementations, business platform 280 may not be cloud-based or may be partially cloud-based. In some implementations, business platform 280 may include or be associated with a business enterprise portal that may be accessible to employees or contractors of an organization of business platform 280.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
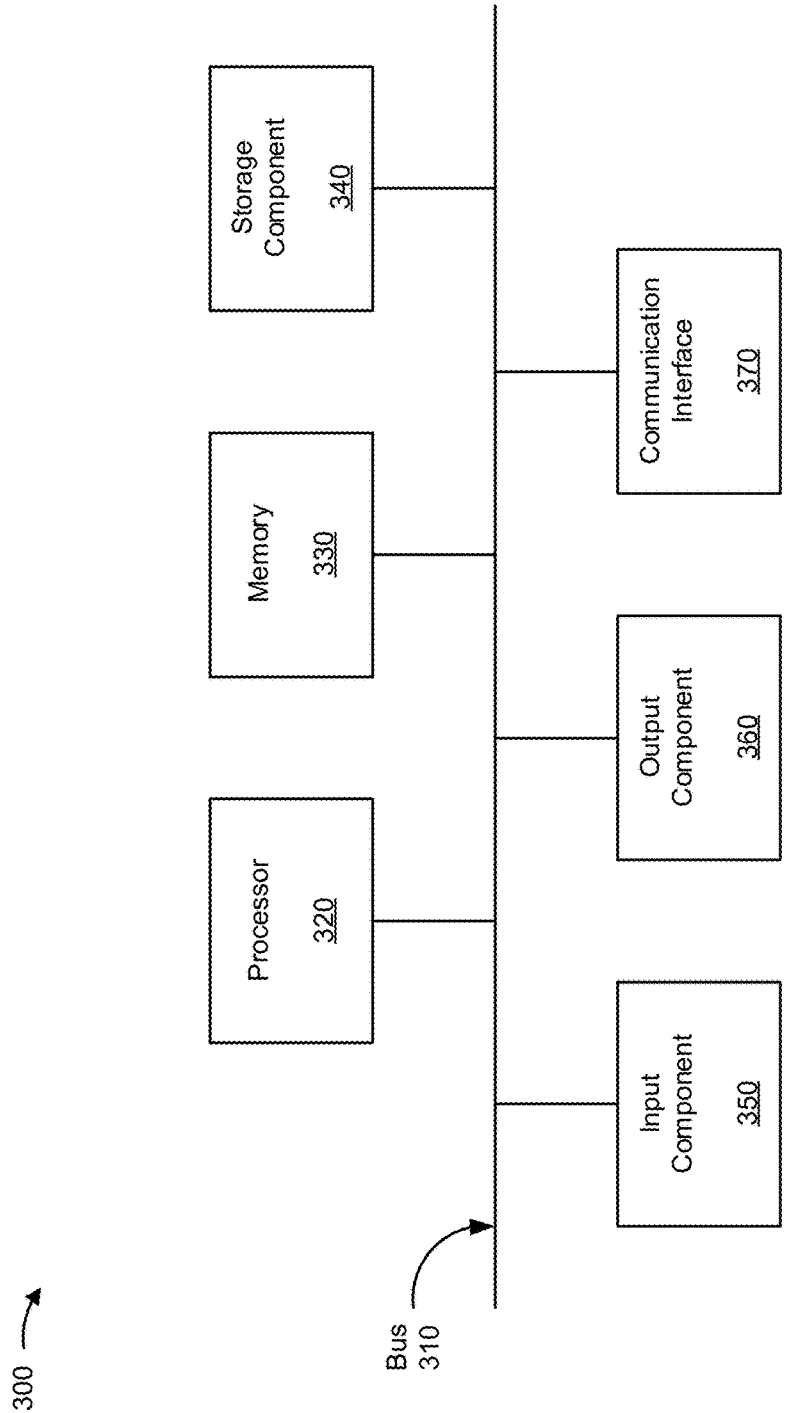
FIG. 3 is a diagram of example components of one or more devices of FIG. 2.

FIG. 3 is a diagram of example components of a device 300. Device 300 may correspond to electronic wallet device 210, smart transaction card 220, transaction terminal 230, user device 240, transaction backend 260, computing resource 275, and/or business platform 280. In some implementations, electronic wallet device 210, smart transaction card 220, transaction terminal 230, user device 240, and/or transaction backend 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state memory), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a RF interface, a universal serial bus (USB) interface, a Wi-Fi interface, a cellular network interface, a Bluetooth interface, a BLE interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
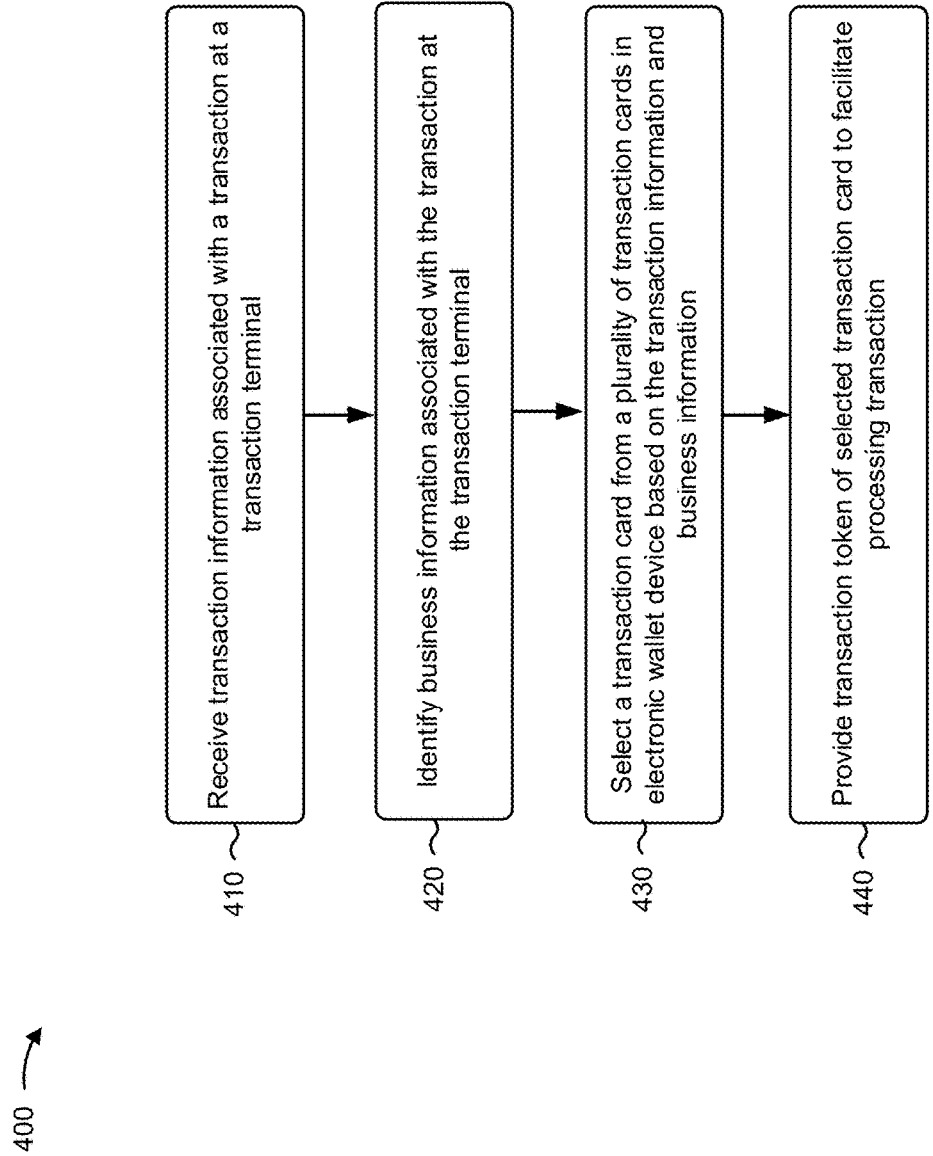
FIG. 4 is a flow chart of an example process that may be implemented in association with an electronic wallet device described herein.

FIG. 4 is a flow chart of an example process 400 that may be implemented in association with an electronic wallet device described herein. In some implementations, one or more process blocks of FIG. 4 may be performed by electronic wallet device 210. In some implementations, one or more process blocks of FIG. 4 may be performed by another device or a group of devices separate from or including electronic wallet device 210, such as smart transaction card 220, transaction terminal 230, user device 240, and/or transaction backend 260.

As shown in FIG. 4, process 400 may include receiving transaction information associated with a transaction at a transaction terminal (block 410). For example, electronic wallet device 210 may receive the transaction information from transaction terminal 230. In some implementations, electronic wallet device 210 may receive the transaction information from smart transaction card 220 and/or user device 240 based on a transaction being initiated at transaction terminal 230.

According to some implementations, electronic wallet device 210, smart transaction card 220, and/or user device 240 may obtain transaction information from transaction terminal 230 via an interaction with transaction terminal 230. For example, electronic wallet device 210, smart transaction card 220, and/or user device 240 may receive transaction information from transaction terminal 230 when placed in communication with transaction terminal 230. Accordingly, electronic wallet device 210 may receive the transaction information directly from transaction terminal 230 (e.g., via a communication interface of electronic wallet device 210) and/or may receive transaction information indirectly from transaction terminal 230 via smart transaction card 220 and/or user device 240.

In some implementations, electronic wallet device 210 may receive the transaction information via a communication interface of the electronic wallet device 210. For example, the communication interface may enable electronic wallet device 210 to communicate with transaction terminal 230, with smart transaction card 220, and/or with user device 240. In some implementations, the communication interface of electronic wallet device 210 may include wired and/or wireless communication interfaces. For example, electronic wallet device 210 may include a terminal interface that includes an IC chip, magnetic strip, RF antenna and/or the like that enables electronic wallet device 210 to communicate with an interface (e.g., a magnetic strip reader, a chip reader, an NFC session terminal, and/or the like) of transaction terminal 230. In some implementations, electronic wallet device 210 may include a wireless communication interface (e.g., a Bluetooth communication interface, a BLE interface, a Wi-Fi interface, an NFC interface, and/or the like) to receive or obtain the transaction information from transaction terminal 230, smart transaction card 220, and/or user device 240.

According to some implementations, the transaction information associated with the transaction may include information associated with an entity that owns and/or operates transaction terminal 230. For example, the transaction information may include a merchant identifier (e.g., information indicating a merchant category associated with transaction terminal 230), acceptable forms of payment for the transaction (e.g., credit payments, debit payments, and/or the like), acceptable types of transaction cards that may be used in the transaction (e.g., acceptable card associations that may be used (e.g., VISA®, MASTERCARD®, AMERICAN EXPRESS®, DISCOVER®, and/or the like)), a monetary value associated with the transaction, a currency used in the transaction, location information corresponding to a location of the transaction, and/or the like.

In this way, electronic wallet device 210 may receive transaction information associated with a transaction at a transaction terminal that may be used to select a transaction card to be used in the transaction.

As further shown in FIG. 4, process 400 may include identifying business information associated with the transaction at the transaction terminal (block 420). For example, electronic wallet device 210 may identify and/or obtain the business information. In some implementations, electronic wallet device 210 may identify the business information based on receiving transaction information from transaction terminal 230.

According to some implementations, business information may be associated with a transaction based on time, location, and/or transaction information that may be coincidental to the business information and the transaction. For example, electronic wallet device 210 may determine, based on the business information, that a transaction is a business transaction if the transaction takes place during a particular time period, at or near a particular location, with a particular merchant, with a particular type of merchant, if less (or more) than a particular amount of currency, and/or the like.

In some implementations, electronic wallet device 210 may receive the business information from user device 240, business platform 280, and/or a user input. For example, user device 240 may provide the business information (e.g., in response to a request for the business information from electronic wallet device 210) via a user device interface of electronic wallet device 210 (e.g., a communication interface of a hub of electronic wallet device 210). Additionally, or alternatively, electronic wallet device 210 may obtain the business information from business platform 280. For example, electronic wallet device 210 may access a business account (e.g., a user profile) associated with a consumer of electronic wallet device 210 and maintained by business platform 280. Furthermore, electronic wallet device 210 may include a user interface that enables a consumer of the electronic wallet device to input or provide business information (e.g., an input that indicates that the transaction is associated with a business transaction).

In some implementations, the business information may include a calendar event indicating that the transaction is associated with a business transaction. For example, electronic wallet device 210 may identify and/or obtain a calendar event, such as an itinerary, a reservation, an appointment, a meeting, and/or the like that indicates that the transaction may be business related (i.e., may be a business transaction). For example, if the transaction takes place during a time period that corresponds to the calendar event, electronic wallet device 210 may determine that the transaction is business transaction. Furthermore, the business information may include an entire electronic calendar. For example, the electronic calendar may be a business calendar of a consumer of the electronic wallet device 210 that includes day-to-day business-related events, meetings, travel, dining, and/or the like. As such, if a transaction takes place during or within a threshold time period of one of the calendar events of the business calendar, electronic wallet device 210 may determine that the transaction is a business transaction.

In some implementations, the business information may include a message indicating that the transaction is associated with a business transaction. For example, electronic wallet device 210 may identify an email, a text message, a voicemail transcription, and/or the like that indicates that the transaction may be business related. More specifically, the message may reference the transaction, may reference a merchant identifier associated with the transaction terminal, may reference an organization or location of the transaction, may reference a business meeting to take place during the transaction, and/or the like. As such, electronic wallet device 210 may determine, based on the message, that the transaction is business related. In some implementations, electronic wallet device 210 (and/or user device 240) may utilize artificial intelligence (AI) and/or machine learning to analyze messages associated with a business. Accordingly, electronic wallet device 210 (and/or user device 240) may determine, over time, which messages may indicate business related transactions and which messages do not indicate business related transactions.

In some implementations, the business information may include authorized business transaction information. For example, electronic wallet device 210 may identify one or more lists of authorized merchants, authorized types of merchants (e.g., which may be identified via the merchant identifier), authorized locations of transactions, approved spending limits (e.g., for certain merchants, merchant types, for certain time periods (e.g., a day, a week, a year, and/or the like). In some implementations, electronic wallet device 210 may determine that a transaction is a business transaction based on a merchant identifier of the transaction information. Accordingly, electronic wallet device 210 may compare the authorized business transaction information with characteristics of the transaction information (e.g., from transaction terminal 230) to determine whether the transaction is an authorized transaction.

In some implementations, the business information may include location information indicating that the transaction is associated with a business transaction. The location information may be identified from the transaction information, messaging information, calendar information, and/or the like. For example, electronic wallet device 210 may identify one or more locations or regions associated with a business transaction (e.g., within a threshold distance of an office of a business organization, within a region or country of a business organization, and/or the like). As such, if electronic wallet device 210 determines that a transaction takes place within a threshold distance of a location designated for business transactions, electronic wallet device 210 may determine that the transaction is a business transaction.

In some implementations, electronic wallet device 210 may obtain business information from one or more applications hosted by user device 240 and/or business platform 280. For example, user device 240 may obtain the business information via a calendar application, a messaging application, a location tracking system, or business platform 280.

In this way, electronic wallet device 210, smart transaction card 220, and/or user device 240 may identify business information associated with the transaction.

As further shown in FIG. 4, process 400 may include selecting a transaction card from a plurality of transaction cards in an electronic wallet device based on the transaction information and the business information (block 430). For example, electronic wallet device 210 may select the transaction card from transaction cards that are inserted into card slots of electronic wallet device 210. In some implementations, electronic wallet device 210 may select the transaction card based on receiving transaction information (and/or a notification of a pending transaction) from transaction terminal 230.

In some implementations, electronic wallet device 210 may identify the plurality or set of transaction cards based on which card slots of the electronic wallet device 210 include transaction cards. For example, electronic wallet device 210 may determine which card slots of electronic wallet device 210 include transaction cards. Electronic wallet device 210 may determine which card slots are holding transaction cards based on determining whether corresponding card readers in the card slots are communicatively coupled (e.g., in physical contact) with IC chips of transaction cards in the card slots. Accordingly, electronic wallet device 210 may hold transaction cards that are available to be used in a transaction at transaction terminal 230. Further electronic wallet device 210 may identify the transaction cards held by electronic wallet device 210 as a set of candidate transaction cards that may be used in a transaction. When selecting a transaction card from a set of transaction cards or a plurality of transaction cards, electronic wallet device may select at least one of the transaction cards from at least two transaction cards.

In some implementations, electronic wallet device 210 may obtain card information associated with the transaction cards in electronic wallet device 210. For example, electronic wallet device 210 may obtain the card information from transaction backend 260 (e.g., via user device 240), from a data structure of electronic wallet device 210, via user input, and/or the like. Card information may include an account identifier (e.g., a name, an account number, and/or the like associated with the account), a card type, a card association, a credit limit, a balance of the account, a type of the account, and/or the like. In some implementations, electronic wallet device 210 may access, via card readers, business account information associated with the transaction cards (e.g., business account numbers, business organization names, business account tier, and/or the like) from IC chips of the transaction cards. In such instances, electronic wallet device 210 may use the business account information to determine that the transaction card is designated for use in business transactions. Accordingly, when electronic wallet 210 determines, based on the transaction information and the business information, that the transaction is a business transaction, electronic wallet device may select the transaction card that is designed for use in business transactions. Alternatively, if electronic wallet device determines from the business information (or lack of business information), that a transaction is not a business transaction, then electronic wallet device 210 may select a non-business transaction card (e.g., a personal transaction card).

According to some implementations, electronic wallet device 210 selects a transaction card from the transaction cards in electronic wallet device 210 by analyzing business information associated with a transaction with respect to the transaction information of a transaction. For example, electronic wallet device 210 may develop a hierarchy of transaction rules that indicate when a transaction is a business transaction or a non-business transaction based on the business information and transaction information. For example, using a merchant identifier from the transaction information, electronic wallet device 210 may determine which transaction card may be used for a business transaction or non-business transaction based on whether the merchant identifier is associated with a business transaction (as indicated by the business information).

In some implementations, electronic wallet device 210 may consider multiple non-business related factors when selecting a transaction card after determining the transaction card is business transaction or a non-business transaction. For example, electronic wallet device 210 may consider rewards earning potential (e.g., which may be based on the merchant identifier), credit limits, account balances, transaction card type, and/or the like. Accordingly, if multiple business transaction cards or multiple non-business transaction cards are included in electronic wallet device 210, electronic wallet device 210 may select from the business transaction cards and the non-business transaction cards based on the non-business related factors.

In some implementations, electronic wallet device 210 may select a business transaction card for a business transaction or a non-business transaction card for non-business transactions based on one or more settings of electronic wallet device 210. For example, via a user input and/or user device 240, a preference may be indicated for certain transaction cards to be used by default, at particular locations, at particular times (e.g., of the week, of the month, and/or the like), at particular merchants or merchant types, and/or the like. Accordingly, settings or rules that electronic wallet device 210 may use to select transaction cards may be configurable.

In some implementations, electronic wallet device 210 may utilize a scoring system to select a transaction card from the plurality of transaction cards based on the transaction information and/or the business information. For example, scores and/or weights may be applied to the transaction information and/or business information. Scores may be calculated for each of the transaction cards in electronic wallet device 210 based on the scoring system, and the transaction card that satisfies a threshold value (e.g., is the greatest value or least value) relative to the others may be selected. Accordingly, an optimal transaction card (i.e., optimal relative to the scoring system) may be selected from the plurality of transaction cards in electronic wallet device 210 for business transactions and/or non-business transactions at transaction terminal 230. As an example, a first business transaction card that incurs foreign transaction fees may offer three times bonus rewards points for a business transaction while a second business transaction card that does not include foreign transaction fees may offer two times bonus rewards points. Depending on weighting of a scoring system used to select the transaction card, electronic wallet device 210 may select the first business transaction card for the business transaction if rewards information is more weighted than avoiding transaction fees (or foreign transaction fees) or the second business transaction card may be selected for the business transaction if avoiding transaction fees is more weighted than rewards information.

Accordingly, electronic wallet device 210 may select a transaction card for use in the transaction at transaction terminal 230 based on transaction information associated with the transaction and/or business information associated with transaction cards in electronic wallet device 210. In this way, electronic wallet device 210 may facilitate processing the transaction by providing a transaction token from the selected transaction card.

As further shown in FIG. 4, process 400 may include providing a transaction token of the selected transaction card to facilitate processing the transaction (block 440). For example, electronic wallet device 210 may provide the transaction token to transaction terminal 230. In some implementations, electronic wallet device 210 may provide the transaction token based on selecting the transaction card for the transaction.

According to some implementations, electronic wallet device 210 may provide the transaction token directly to transaction terminal 230 and/or indirectly to transaction terminal 230 (e.g., via smart transaction card 220 and/or user device 240). For example, electronic wallet device 210 may provide the transaction token via a terminal interface of electronic wallet device 210 and/or via a wireless communication interface of electronic wallet device 210. Accordingly, electronic wallet device 210 may communicate the transaction token to transaction terminal 230, such that transaction terminal 230 may process the transaction.

In some implementations, electronic wallet device 210 obtains the transaction token from the transaction card via a card reader of electronic wallet device 210 in communication with the transaction card. For example, a card reader of electronic wallet device 210 may obtain the transaction token from an IC chip of the transaction card and forward the transaction token to the transaction terminal 230. A transaction token may be any key, code, or security data used to facilitate processing a transaction. For example, the transaction token may be an encrypted key that authorizes a transfer of funds through transaction backend 260 (e.g., from a financial institution of a consumer associated with electronic wallet device 210 to a financial institution associated with an entity of transaction terminal 230).

In this way, electronic wallet device 210 may be used to select a transaction card from a plurality of transaction cards that may be used to process a transaction at transaction terminal 230 based on information associated with transaction terminal 230 and/or the plurality of transaction cards. Accordingly, the transaction card may be used in connection with a transaction terminal to process the transaction.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 that may be implemented in association with a smart transaction card and an electronic wallet device described herein. In some implementations, one or more process blocks of FIG. 5 may be performed by smart transaction card 220. In some implementations, one or more process blocks of FIG. 5 may be performed by another device or a group of devices separate from or including smart transaction card 220, such as electronic wallet device 210, transaction terminal 230, user device 240, and/or transaction backend 260.

As shown in FIG. 5, process 500 may include obtaining transaction information associated with a transaction at a transaction terminal (block 510). For example, smart transaction card 220 may obtain the transaction information. In some implementations, smart transaction card 220 obtains the transaction information based on detecting an interaction with transaction terminal 230, such as smart transaction card 220 detecting that smart transaction card 220 has been inserted into a chip reader of transaction terminal 230 or smart transaction card 220 is within range to hold an NFC session with transaction terminal 230.

As described above, the transaction information may include a merchant identifier, information indicating acceptable forms of payment, information indicating acceptable types of transaction cards, a monetary value of the transaction, a currency of the transaction, a location of the transaction, and/or the like. Smart transaction card 220 may obtain the transaction information by transaction terminal 230 indicating or providing the transaction information to smart transaction card 220 based on the interaction with smart transaction card 220.

In this way, smart transaction card 220 may obtain transaction information associated with a transaction from transaction terminal 230.

As further shown in FIG. 5, process 500 may include providing the transaction information to an electronic wallet device (block 520). For example, smart transaction card 220 may provide the transaction information to the electronic wallet device 210. In some implementations, smart transaction card 220 may provide the transaction information to electronic wallet device 210 based on obtaining the transaction information.

According to some implementations, smart transaction card 220 may provide the transaction information to electronic wallet device 210 via a communication link. For example, smart transaction card 220 may provide the transaction information via a Bluetooth communication link, a BLE communication link, a Wi-Fi communication link, an NFC session, and/or the like. In some implementations, smart transaction card 220 may provide the transaction information to electronic wallet device 210 via a network (e.g., network 250). For example, electronic wallet device 210 may be at a first location (e.g., a consumer's home) and smart transaction card 220 may be at a second location (e.g., a merchant). In such an example, smart transaction card 220 may send the transaction information through one or more networks to electronic wallet device 210 (which may then respond through the network with a card selection notification and/or transaction token).

In some implementations, smart transaction card 220 may request electronic wallet device 210 to provide a transaction token based on the obtained transaction information. For example, smart transaction card 220 may send a request message that includes the obtained transaction information.

In this way, smart transaction card 220 may provide the transaction information to electronic wallet device 210 to enable electronic wallet device 210 to provide a transaction token for the transaction.

As further shown in FIG. 5, process 500 may include receiving a transaction token associated with a transaction card in the electronic wallet device (530). For example, smart transaction card 220 may receive the transaction token from electronic wallet device 210. In some implementations, smart transaction card 220 may receive the transaction token from electronic wallet device 210 based on electronic wallet device 210 receiving the transaction information and/or selecting a transaction card to be used to facilitate processing the transaction.

As described in some implementations herein, the transaction card may be selected by electronic wallet device 210 based on the transaction information and/or card information. Accordingly, after selecting the transaction card, electronic wallet device 210 may obtain the transaction token from the transaction card and send the transaction token to smart transaction card 220.

In this way, smart transaction card 220 may receive a transaction token associated with a transaction card in electronic wallet device 210 to enable smart transaction card 220 to provide the transaction token to transaction terminal 230 to facilitate processing the transaction.

As further shown in FIG. 5, process 500 may include providing the transaction token to the transaction terminal to facilitate processing the transaction (block 540). For example, smart transaction card 220 may provide the transaction token to transaction terminal 230. In some implementations, smart transaction card 220 may provide the transaction token to the transaction terminal 230 based on receiving the transaction token from electronic wallet device 210.

In some implementations, smart transaction card 220 may provide the transaction token to transaction terminal 230 via a chip reader of transaction terminal 230. For example, smart transaction card 220 may communicate the transaction token via an IC chip of smart transaction card 220 that is communicatively coupled (e.g., in physical contact) with the chip reader of transaction terminal 230. Accordingly, in some implementations, smart transaction card 220 may be inserted into a chip reader of transaction terminal 230 to engage in a transaction, retrieve and provide the transaction information, and remain in transaction terminal 230 at least until the transaction is processed by transaction terminal 230 using the received and provided transaction token from the transaction card of electronic wallet device 210.

In this way, smart transaction card 220 may facilitate processing a transaction at transaction terminal 230 using a transaction token from one or more transaction cards of electronic wallet device 210.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 that may be implemented in association with a user device and an electronic wallet device described herein. In some implementations, one or more process blocks of FIG. 6 may be performed by user device 240. In some implementations, one or more process blocks of FIG. 6 may be performed by another device or a group of devices separate from or including user device 240, such as electronic wallet device 210, smart transaction card 220, transaction terminal 230, and/or transaction backend 260.

As shown in FIG. 6, process 600 may include receiving a request for business information from an electronic wallet device, where the business information is associated with a transaction (block 610). For example, user device 240 may receive the request for the business information from electronic wallet device 210. In some implementations, user device 240 may receive the business information from electronic wallet device 210 based on a transaction being initiated (e.g., via smart transaction card 220 or user device 240) or pending at transaction terminal 230.

User device 240 may receive the request for business information via a communication link between user device 240 and electronic wallet device 210. The example request may be a message, data packet, and/or the like providing information associated with a transaction associated with the electronic wallet device 210. For example, the request may include information identifying a time period of the transaction. Accordingly, the user device may obtain the business information.

In this way, user device 240 may receive a request for business information for the transaction to cause user device 240 to obtain the business information (e.g., from an application of user device 240 and/or business platform 280).

As further shown in FIG. 6, process 600 may include obtaining the card information for the plurality of transaction cards in the electronic wallet device (block 620). For example, user device 240 may obtain the card information for the plurality of transaction cards. In some implementations, user device 240 obtains the card information based on receiving the request from electronic wallet device 210.

As described herein, the business information may include calendar information, message information, authorization information, location information, and/or the like. Accordingly, user device 240 may obtain the business information via a calendar application, a messaging application, a location tracking system, business platform 280, and/or the like. For example, user device 240 may identify calendar events of a calendar application that indicate that the transaction is business related (e.g., based on the transaction being within a time period of the calendar event or within a threshold time period of the calendar event). As another example, user device 240 may scan or analyze messages (e.g., text messages, emails, voicemail transcripts, and/or the like) that were sent or received via a messaging application within a threshold time period of the transaction to determine the messages include business related information associated with the transaction.

In some implementations, user device 240 may obtain business information from business platform 280. For example, user device 240 may request business information from a business enterprise portal of business platform 280 that provides information on business transaction authorizations of employees of the business enterprise. More specifically, the business enterprise portal may indicate that a particular employee, having a business transaction card in electronic wallet device 210, is authorized to use the business transaction card at particular times, at particular locations, for particular amounts, for particular types of purchases, up to a particular limit (e.g. per day, per month, per year), and/or the like.

In some implementations, user device 240 may store the business information. For example, user device 240 may store the business information in a data structure of user device 240. In such cases, the business information may be downloaded and/or installed on user device 240 (e.g., from a website, from business platform 280, via user input, via an application, and/or the like).

In this way, user device 240 may obtain business information for the transaction to permit user device 240 to provide the business information to electronic wallet device 210.

As further shown in FIG. 6, process 600 may include providing the business information to the electronic wallet device, such that the electronic wallet device may provide, based on the business information, a transaction token from a transaction card of the plurality of transaction cards for a transaction (block 630). For example, user device 240 may provide the business information to electronic wallet device 210 to enable electronic wallet device 210 to determine whether a transaction is a business transaction or a non-business transaction. In some implementations, user device 240 may provide the business information to electronic wallet device 210 based on obtaining the business information and/or receiving the request for the business information from electronic wallet device 210. According to some implementations, user device 240 may provide the business information to electronic wallet device 210 via a communication link (e.g., a Bluetooth communication link, a BLE link, an NFC session link, a Wi-Fi communication link, and/or the like).

User device 240 may provide the business information to electronic wallet device 210 to enable electronic wallet device 210 to select a transaction card (e.g., either a business transaction card or a non-business transaction card), for a transaction, from the plurality of transaction cards in electronic wallet device 210 according to some implementations described herein.

Additionally, or alternatively, user device 240 may select the transaction card based on the business information and/or transaction information received from transaction terminal 230. For example, based on user device 240 interacting with transaction terminal 230 (e.g., via an NFC session) to engage in a transaction, user device 240 may select a business transaction card or non-business transaction card and provide the card information (e.g., card identification information) with a request that electronic wallet device 210 provide a transaction token, associated with the selected business transaction card or non-business transaction card indicated in the card information, to user device 240. Accordingly, user device 240 may process the transaction using the transaction token received from electronic wallet device 210.

In this way, user device 240 may be used in association with electronic wallet device 210 to facilitate processing a transaction at transaction terminal 230 according to some implementations described herein.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
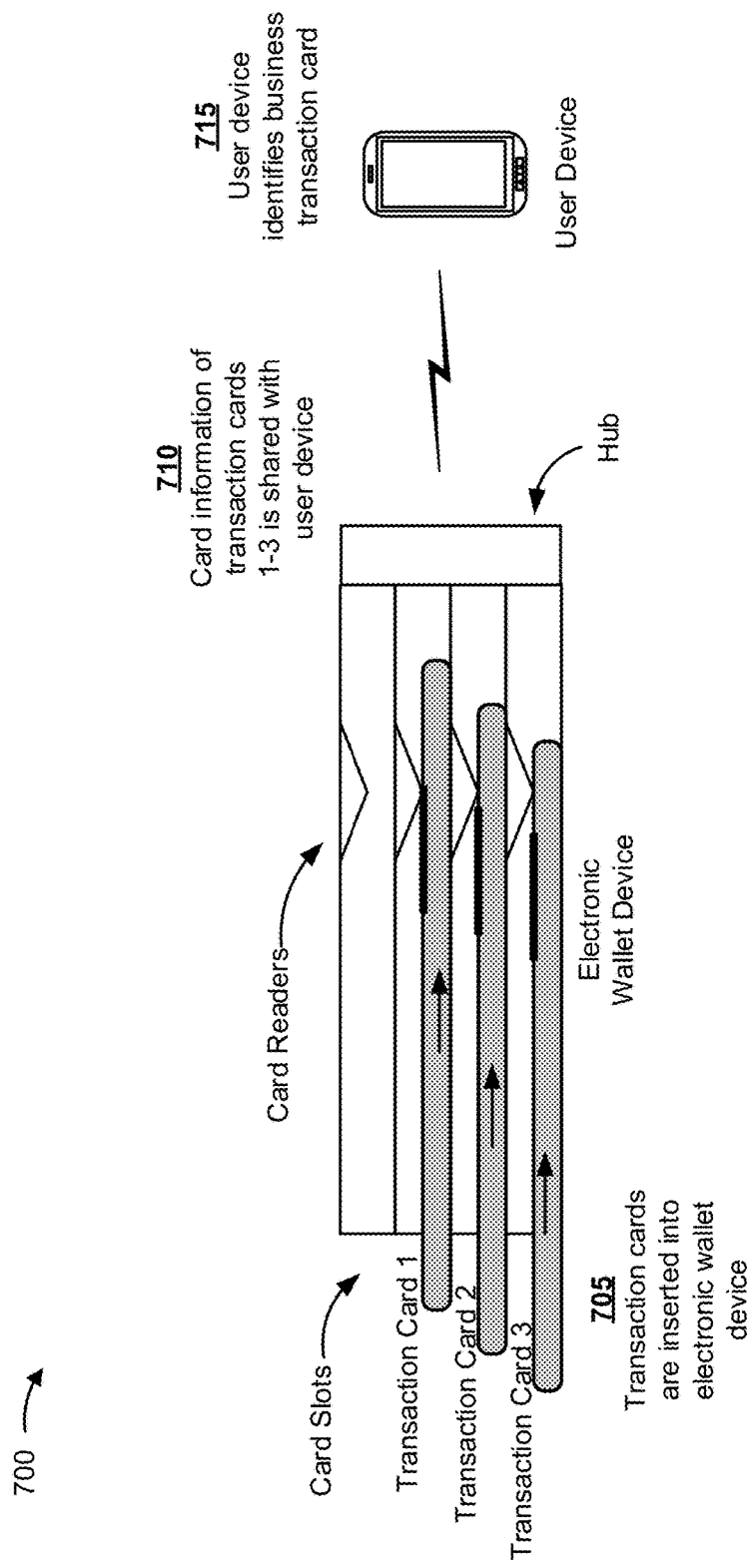
FIGS. 7A-7C are diagrams of an example implementation relating to example processes shown in FIGS. 4, 5, and/or 6.
Figure 7B:
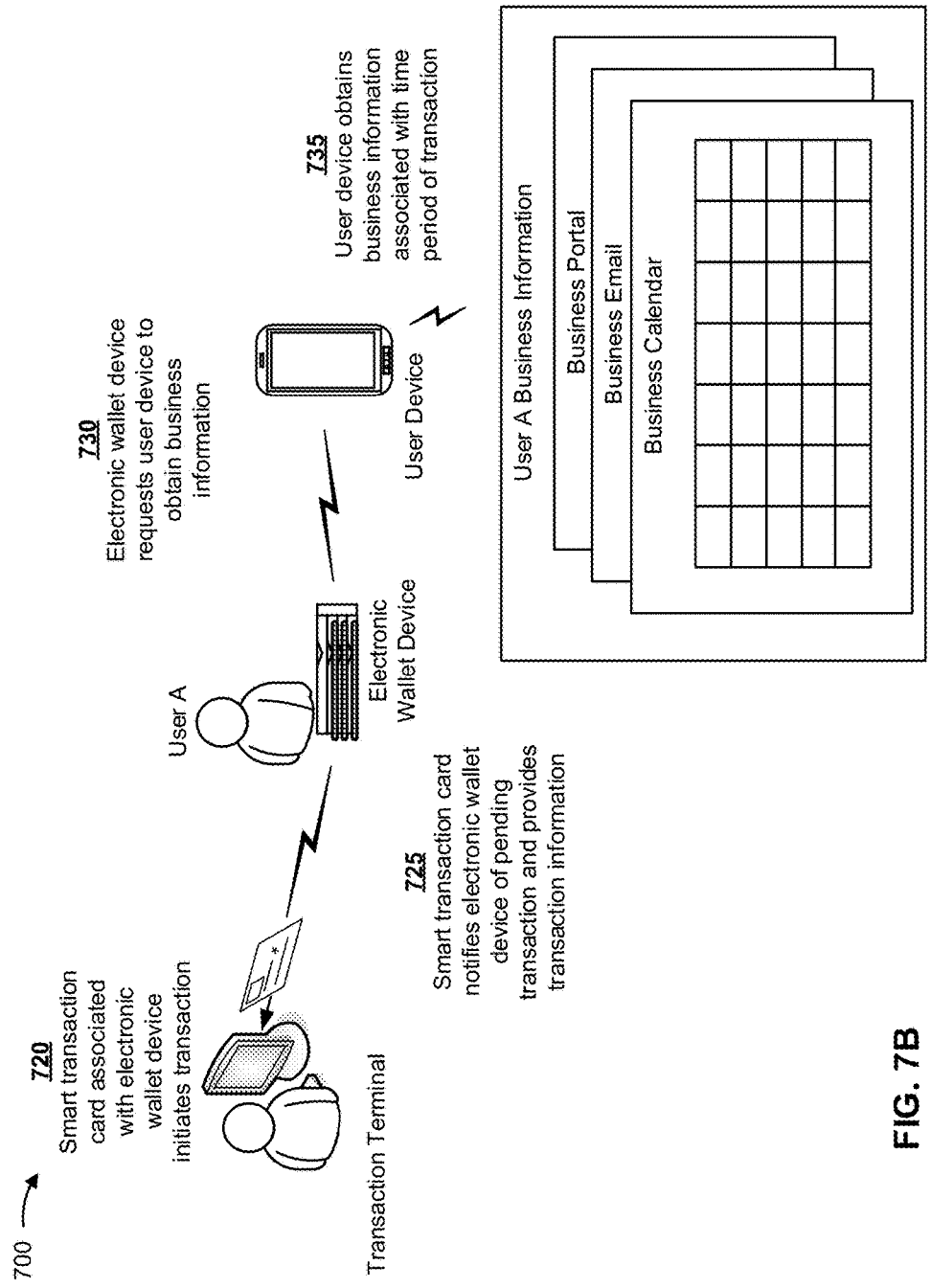
Figure 7C:
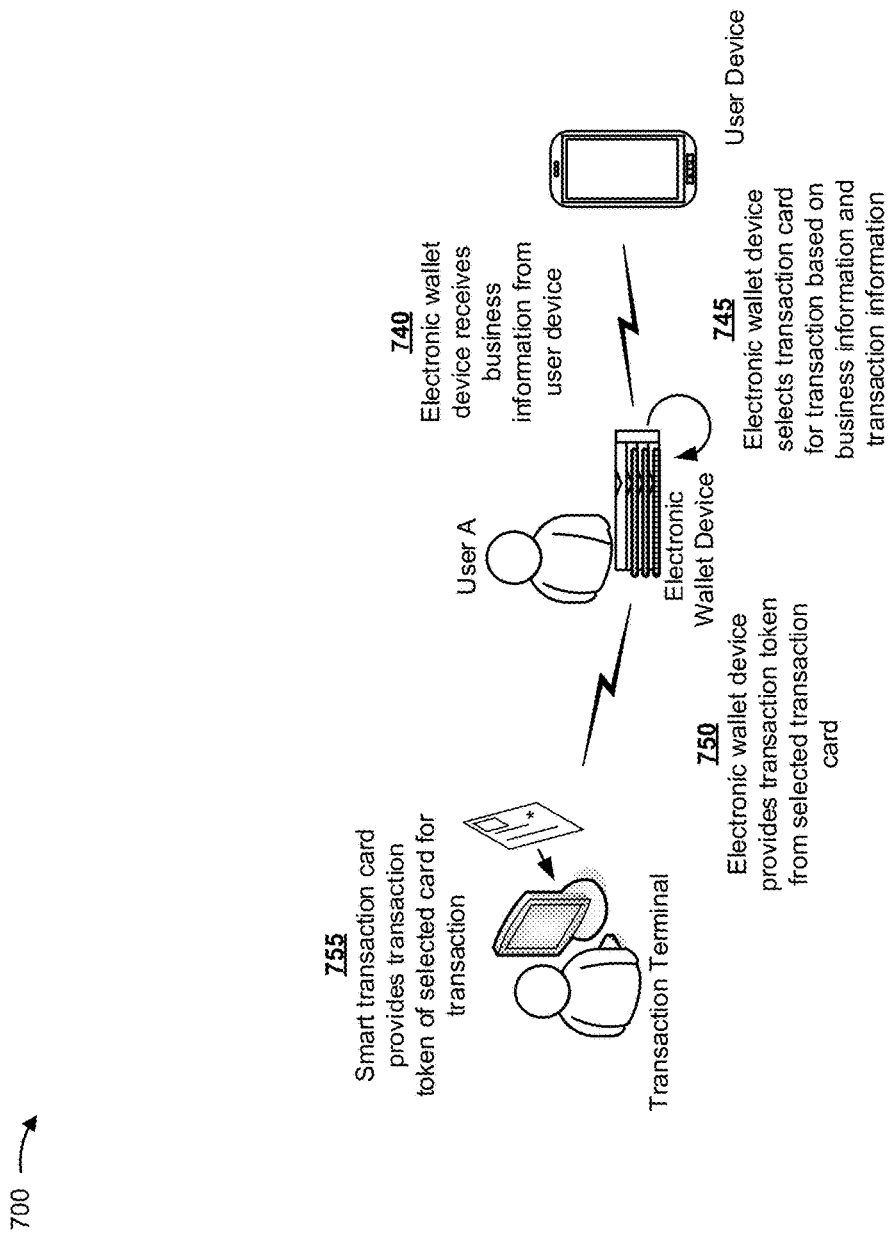

FIGS. 7A-7C are diagrams of an example implementation 700 relating to example processes 400, 500, and/or 600 shown in FIGS. 4, 5, and/or 6, respectively. FIGS. 7A-7C show an example of using an electronic wallet device and a user device to facilitate processing a transaction with a smart transaction card according to some implementations herein.

As shown in FIG. 7A, and by reference number 705, transaction cards 1-3 are inserted into an electronic wallet device. The electronic wallet device may share card information of transaction cards 1-3 with a user device, as shown by reference number 710. For example, electronic wallet device may share an account identifier (e.g., an account number), card expiration information, a card verification number, and/or the like with the user device. As shown by reference number 715, the user device identifies a business transaction card. For example, the user device may determine that one of the transaction cards 1-3 is a business transaction card based on the card information provided. The card information may include information identifying a business account or that the card is a business type transaction card.

As shown in FIG. 7B, and by reference number 720, a smart transaction card associated with the electronic wallet device initiates a transaction at a transaction terminal. The smart transaction card may notify the electronic wallet device of a pending transaction (or an initiated transaction) and provides transaction information to the electronic wallet device, as shown by reference number 725. Further, in FIG. 7B, as shown by reference number 730, the electronic wallet device requests the user device to obtain business information (e.g., business information associated with the transaction). In some implementations, the electronic wallet device may obtain the business information directly from an application or data structure (e.g., business platform 280) that includes business information of User A.

As further shown in FIG. 7B, and by reference number 735, the user device obtains the business information from one or more applications or data structures that includes business information associated with a time period of the transaction (e.g., within the hour, the day, the week, and/or the like). As shown, the business information may be associated with User A's calendar, business email, and/or business portal. Accordingly, the user device can obtain business information that may be associated with transaction.

As shown in FIG. 7C, and by reference number 740, the electronic wallet device receives the business information from the user device. For example, the user device may forward and/or send the business information to the electronic wallet device. The electronic wallet device may select the transaction card for the transaction based on the business information and the transaction information, as shown by reference number 745. In FIG. 7C, as shown by reference number 750, the electronic wallet device provides a transaction token from the selected transaction card to the smart transaction card. The smart transaction card then provides the transaction token of the selected card to the transaction terminal, as shown by reference number 755.

Accordingly, a user device may be used in accordance with an electronic wallet device to obtain business information. In such cases, the electronic wallet device may use the business information (along with transaction information) to select a transaction card for a transaction according to some implementations described herein.

As indicated above, FIGS. 7A-7C are provided merely as an example. Other examples are possible and may differ from what was described with regard to FIGS. 7A-7C.

Figure 8A:
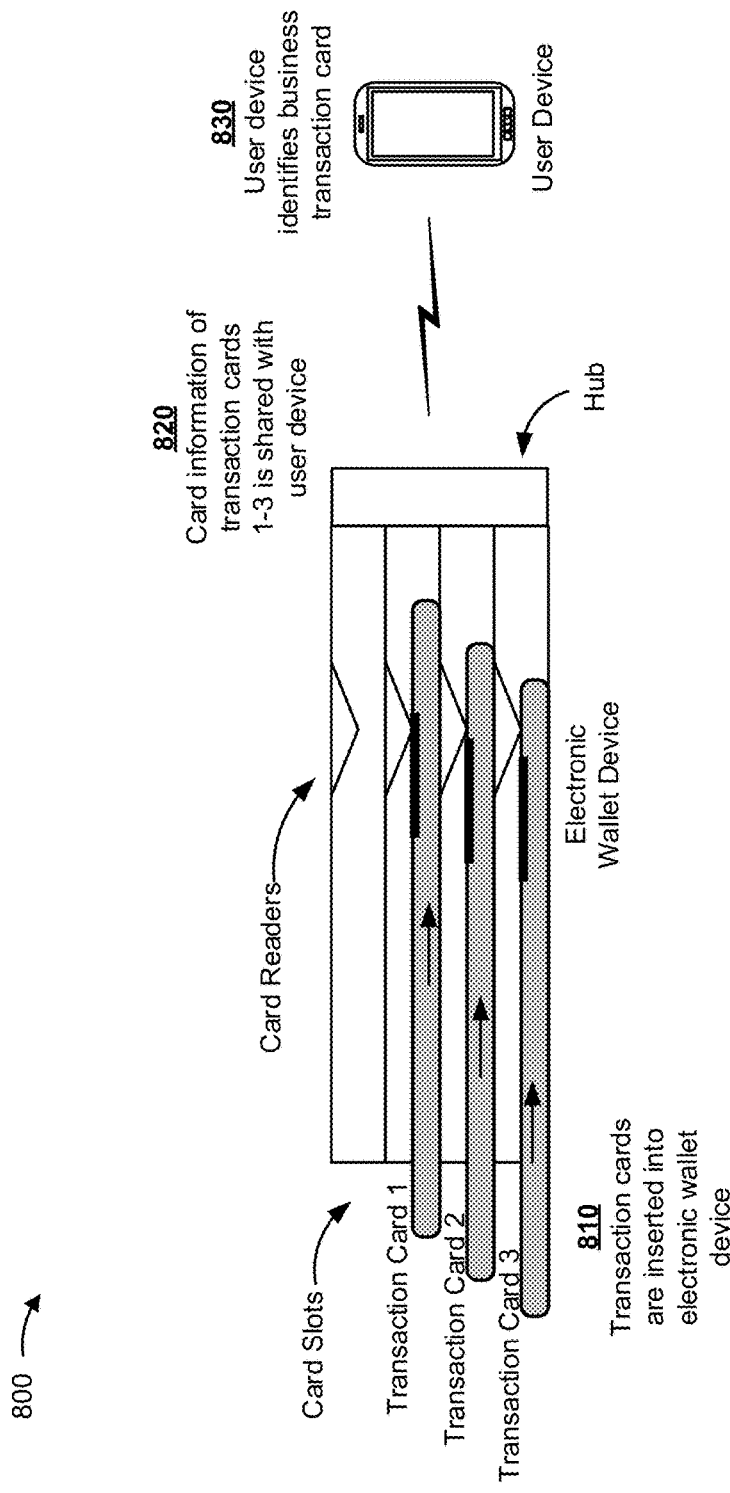
FIGS. 8A-8C are diagrams of an example implementation relating to example processes shown in FIGS. 4, 5, and/or 6.
Figure 8B:
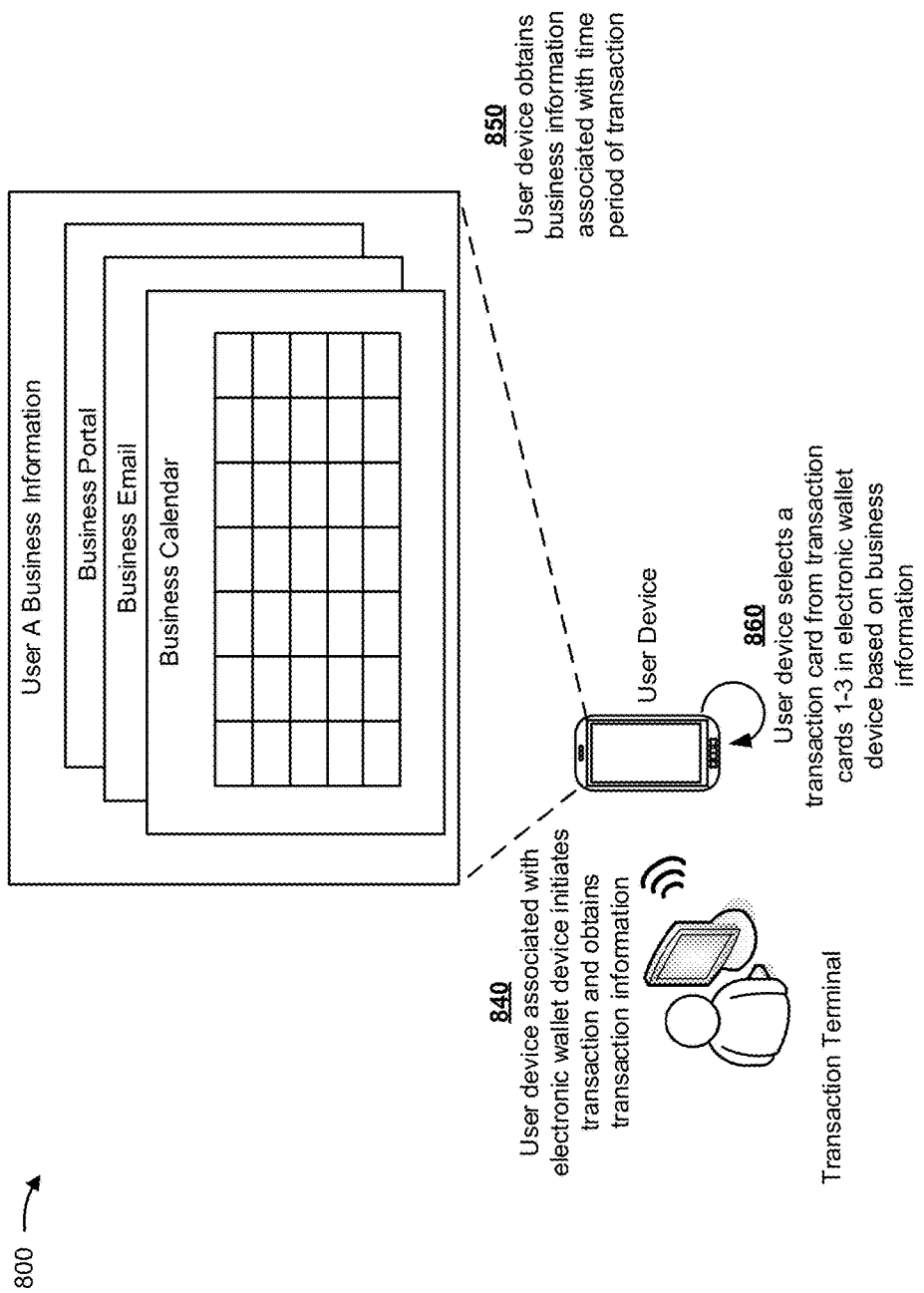
Figure 8C:
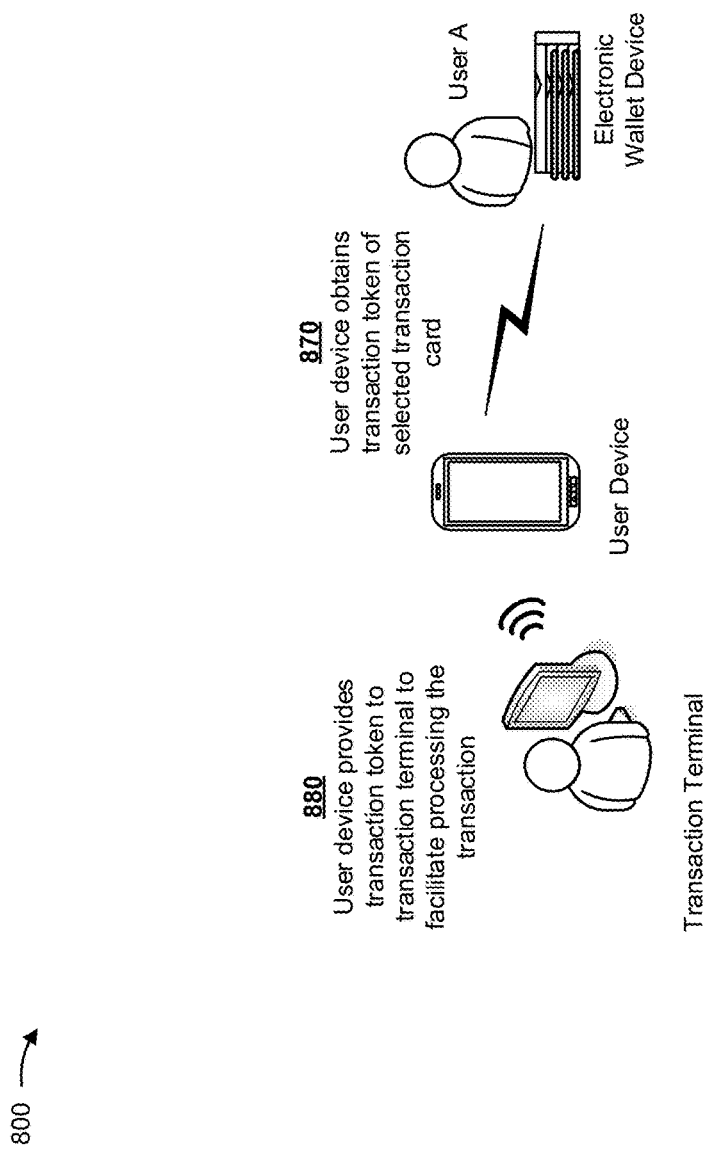

FIGS. 8A-8C are diagrams of an example implementation 800 relating to example processes 400, 500, and/or 600 shown in FIGS. 4, 5, and/or 6, respectively. FIGS. 8A-8C show an example of using an electronic wallet device and a user device to facilitate processing a transaction according to some implementations herein.

As shown in FIG. 8A, and by reference number 810, transaction cards 1-3 are inserted into an electronic wallet device. The card information of transaction cards 1-3 is shared with the user device, as shown by reference number 820. As shown by reference number 830, the user device identifies a business transaction card.

As shown in FIG. 8B, and by reference number 840, the user device associated with the electronic wallet device initiates a transaction with a transaction terminal and obtains transaction information. For example, the user device may interact with the transaction terminal via an NFC session to engage in the transaction. As shown by reference number 850 in FIG. 8B, the user device obtains business information associated with the transaction. As shown by reference number 860, the user device selects a transaction card from the transaction cards 1-3 in the electronic wallet based on the business information and transaction information.

As shown in FIG. 8C, and by reference number 870, the user device obtains a transaction token of the selected transaction card from the electronic wallet device. For example, the user device may send a request to electronic wallet device for a transaction token from the transaction card selected from transaction cards 1-3. In such an example, the electronic wallet device may obtain the transaction token from the selected transaction card (e.g., via an IC chip of the transaction card), and send the transaction token to the user device. As shown by reference number 880 of FIG. 8C, the user device may provide the transaction token to the transaction terminal to facilitate processing the transaction. In some implementations, the user device may provide the transaction token to the transaction terminal via an NFC session (e.g., via a same or separate NFC session that was used to engage in the transaction and obtain the transaction information).

Accordingly, a user device may select a transaction card from transaction cards in an electronic wallet device to facilitate processing a transaction. The user device may select the transaction card based on business information associated with the transaction card and/or transaction information associated with the transaction according to some implementations described herein.

As indicated above, FIGS. 8A-8C are provided merely as an example. Other examples are possible and may differ from what was described with regard to FIGS. 8A-8C.

Figure 9:
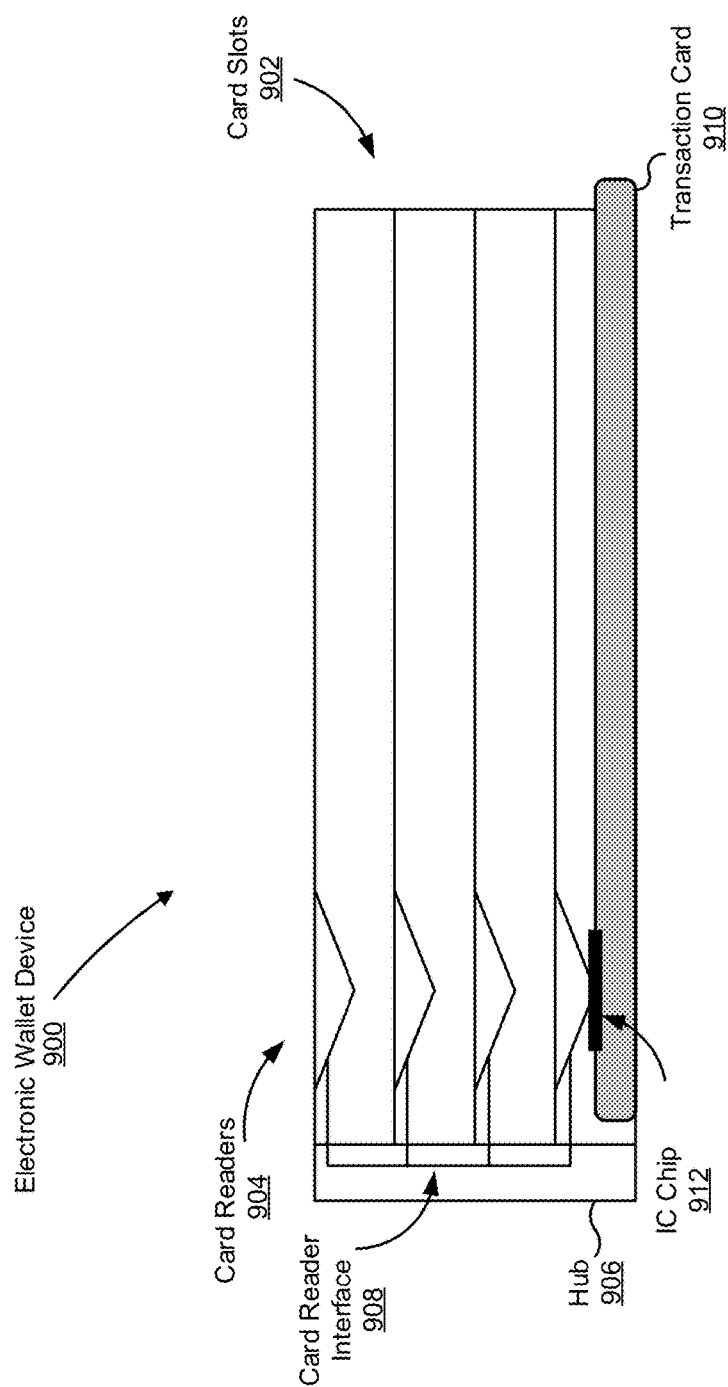
FIGS. 9-12 are diagrams of example implementations of an electronic wallet device described herein.

FIG. 9 is a diagram of an example implementation of an electronic wallet device 900 described herein. Electronic wallet device 900 may correspond to electronic wallet device 210 of FIG. 2. As shown in FIG. 9, electronic wallet device 900 may include card slots 902 with card readers 904 in each of card slots 902. Card readers 904 are configured to interface with transaction cards (e.g., IC chips of transaction cards) inserted into card slots 902. Although electronic wallet device 900 is shown to include four card slots 902, electronic wallet device 900 may include more or less than four card slots 902.

The electronic wallet device 900 of FIG. 9 includes a hub 906. As shown, the hub 906 includes a card reader interface 908 that is communicatively coupled with the card readers 904 of the card slots 902. In some implementations, hub 906 may include one or more processors (e.g., processor 320) and/or one or more communication interfaces (e.g., communication interface 370). For example, the one or more processors of hub 906 may communicate with other devices (e.g., smart transaction card 220, user device 240, business platform 280, and/or the like) and/or network 250 via a Bluetooth communication interface, a BLE interface, a NFC interface, a Wi-Fi communication interface, a cellular communication interface, and/or the like. In some implementations, hub 906 may include a user device interface (which may include a wired or wireless communication interface), such that hub 906 may receive business information from user device 240 via the user device interface. In some implementations, card reader interface 908 may include or be implemented by a switching component that includes one or more switches enabling or disabling access to card readers 904.

According to some implementations, card slots 902 are configured to receive transaction cards. As shown in FIG. 9, transaction card 910 is inserted into one of the card slots 902. Transaction card 910 may be inserted such that an IC chip 912 of the transaction card is communicatively coupled (e.g., in physical contact) with a corresponding card reader 904 of the corresponding card slot 902. Accordingly, hub 906 may obtain card information associated with transaction card 910 and/or a transaction token from transaction card 910 via card reader 904. Using the card reader interface 908, hub 906 may provide the transaction terminal to another device (e.g., smart transaction card 220, transaction terminal 230, user device 240, and/or the like). In some implementations, hub 906 may be used to receive, request, analyze, and/or compare card information, business information, and/or transaction information for a transaction according to some implementations described herein.

In some implementations, electronic wallet device 900 of FIG. 9 may include a user interface (e.g., input component 350, output component 360, and/or the like). For example, a user interface of electronic wallet device 900 may enable a user to configure settings for hub 906, enter information associated with transaction cards inserted into the card slots 902, enter preferences for selecting transaction cards in card slots 902 (e.g., by weighting avoiding transaction fees more than rewards earning potential or vice versa), and/or the like. In some implementations, hub 906 may be configured via a user interface of another device in communication with electronic wallet device 900 (e.g., user device 240).

In some implementations, a user interface of electronic wallet device 900 may include a mechanical mechanism to select which of the transaction cards is to be used in a particular transaction and/or available for use in a particular transaction. For example, the user interface may include a mechanical switching apparatus that connects and/or disconnects the transaction cards in the card slots 902 to/from the card reader interface 908. Accordingly, electronic wallet device 900 may hold cards in card slots 902 without making them available for use in a transaction.

In some implementations, electronic wallet device 900 may be a wearable item and/or wearable device and/or included within a wearable item and/or wearable device. For example, electronic wallet device 900 may be integrated into an article of clothing (e.g., shorts, pants, a shirt, a coat, under garments, and/or the like), a belt, a bag, a purse, a backpack, a wallet, a wrist band, a sleeve, an arm strap, and/or the like. Furthermore, in some implementations, card slots 902 with card readers 904 may be integrated into the wearable device. For example, the card slots 902 may be pockets of the wearable device, may be included within pockets of the wearable device, or may appear to be pockets of the wearable device. In such cases, the transaction cards may be received via openings in the pockets of the wearable device. Accordingly, in some implementations, a consumer may insert transaction cards into a wearable device worn on the consumer's person. As such, the transaction cards of the electronic wallet device may be worn or held by a consumer in a manner that enables the consumer to carryout transactions without removing the transaction cards from electronic wallet device 210 of the wearable device. For example, the electronic wallet device may communicate with a transaction terminal via a smart transaction card (e.g., smart transaction card 220), a user device (e.g., user device 240), and/or any other device that may be more accessible to a user than the transaction cards held in the electronic wallet device.

In some implementations, a smart transaction card (e.g., similar to smart transaction card 220) may be inserted into a card slot 902 of electronic wallet device 900. In such cases, the smart transaction card in the electronic wallet device may serve as a hub and/or communication device to facilitate selection of a transaction card in the remaining card slots of card slots 902, communication with a transaction terminal (e.g., transaction terminal 230) and/or communication with a user device (e.g., user device 240). Accordingly, a smart transaction card in a card slot 902 of electronic wallet device 900 may implement the example processes and devices described herein.

In this way, electronic wallet device 900 may be used to receive and/or hold a plurality of transaction cards and provide a transaction token from at least one of the plurality of transaction cards according to some implementations described herein.

As indicated above, FIG. 9 is provided merely as an example. Other examples are possible and may differ from what was described with regard to FIG. 9.

Figure 10:
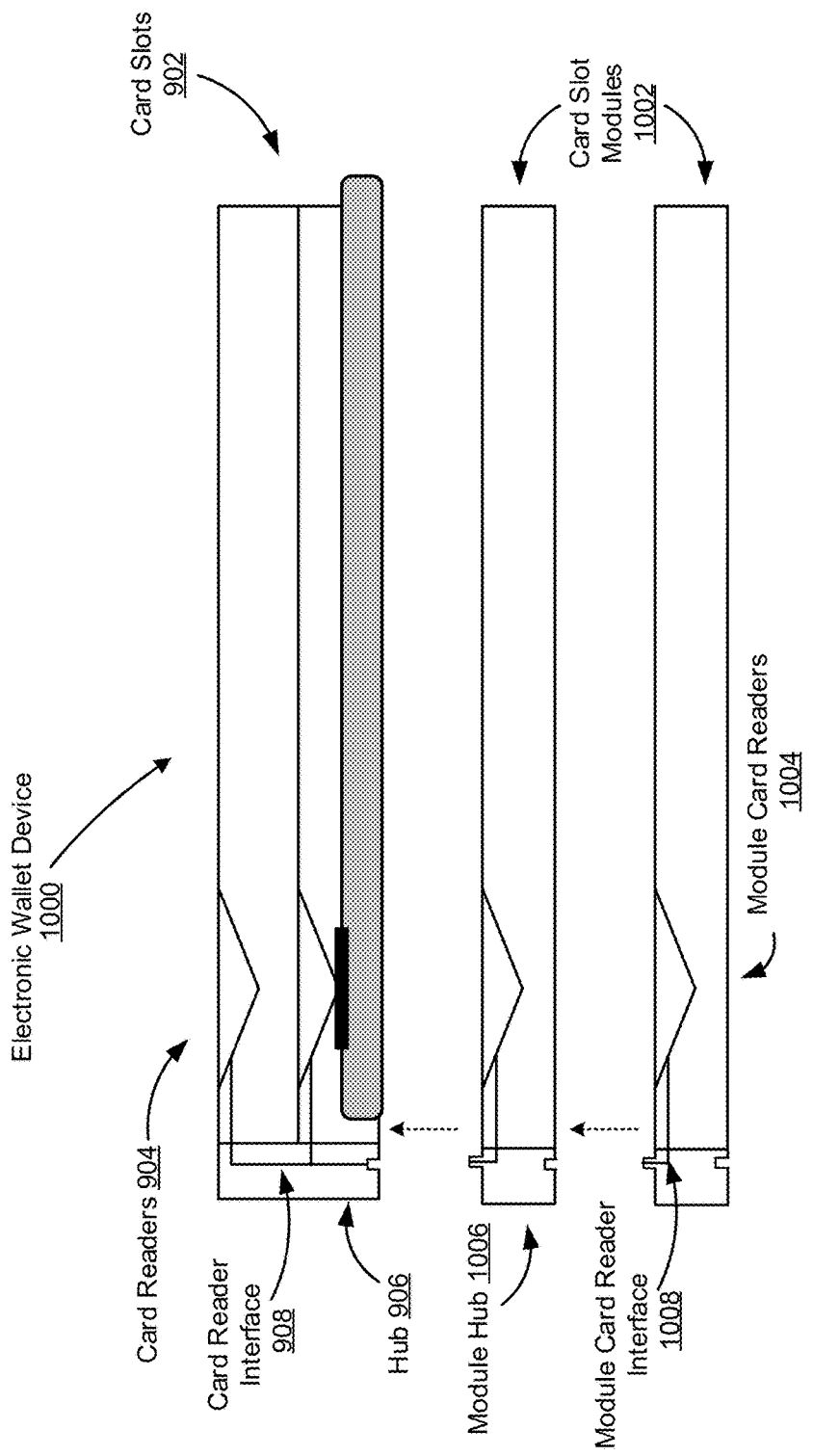

FIG. 10 is a diagram of an example implementation of an electronic wallet device 1000 described herein. Electronic wallet device 1000 may correspond to electronic wallet device 210 of FIG. 2. In FIG. 10, the reference numbers in common with FIG. 9 identify the same or similar elements. For example, electronic wallet device 1000 may include card slots 902, card readers 904, hub 906, card reader interface 908, and/or one or more features described above in connection with FIG. 9.

As shown in FIG. 10, electronic wallet device 1000 may be modular in that electronic wallet device 1000 may add or remove one or more card slot modules 1002 and/or other components. Accordingly, electronic wallet device 1000 may be adjustable and may hold variable amounts of transaction cards. As shown in FIG. 10, card slot modules 1002 may include module card readers 1004, module hubs 1006, and/or module card reader interfaces 1008. In some implementations, when card slot modules 1002 are attached (e.g., communicatively coupled) to electronic wallet device 1000, module hubs 1006 may connect with hub 906 and module card reader interfaces 1008 may connect with card reader interface 908. Accordingly, when card slot modules 1002 are connected with electronic wallet device 1000, electronic wallet device 1000 may include four card slots (e.g., similar to electronic wallet device 900 of FIG. 9).

Accordingly, electronic wallet device 1000 may be a modular device that is capable of adding and/or removing card slots. In some implementations, other features of electronic wallet devices described herein may be modular. For example, hub 906 (and/or components of hub 906) may be removable and/or replaceable. Accordingly, functionality of electronic wallet device 1000 may be adjustable.

As indicated above, FIG. 10 is provided merely as an example. Other examples are possible and may differ from what was described with regard to FIG. 10.

Figure 11:
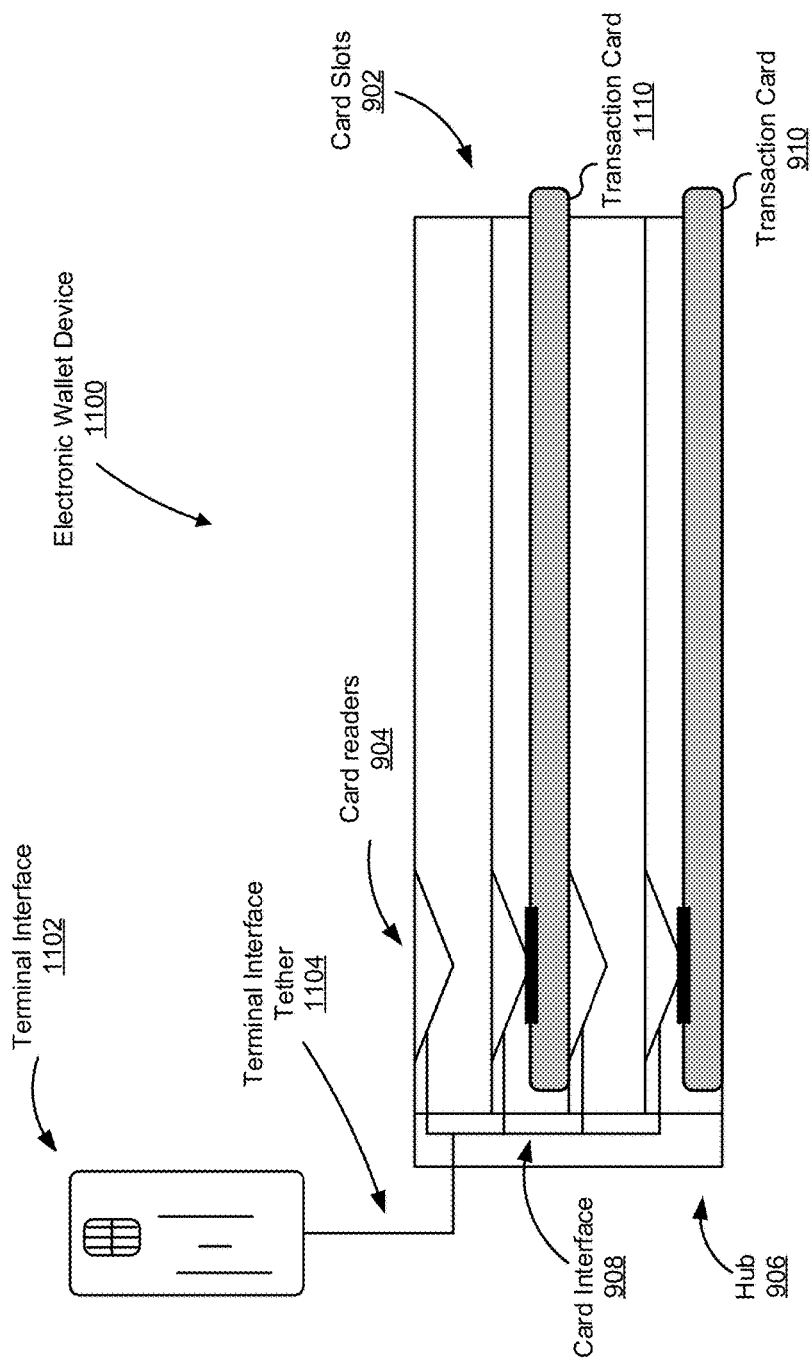

FIG. 11 is a diagram of an example implementation of an electronic wallet device 0 described herein. Electronic wallet device 1100 may correspond to electronic wallet device 210 of FIG. 2. In FIG. 11, the reference numbers in common with FIG. 9 identify the same or similar elements. For example, electronic wallet device 1100 may include card slots 902, card readers 904, hub 906, card reader interface 908, and/or one or more features described above in connection with FIG. 9.

As shown in FIG. 11, electronic wallet device 1100 may include a terminal interface 1102 that may directly communicate with a transaction terminal (e.g., transaction terminal 230). For example, terminal interface 1102 may include a plurality of interfaces to interact with a transaction terminal, such as a magnetic strip, an IC chip, an RF antenna, and/or the like. Accordingly, terminal interface 1102 may be used in a similar manner as a transaction card. As such, terminal interface 1102 may be used to obtain information (e.g., transaction information or notifications of a pending transaction) from a transaction terminal and/or provide information or data (e.g., a transaction token) to a transaction terminal.

As shown in FIG. 11, terminal interface 1102 is connected to card reader interface 908 of electronic wallet device 1100 via a terminal interface tether 1104. Terminal interface tether 1104 may include a wired communication interface (e.g., a conductive wire) to connect the terminal interface with hub 906 and/or card reader interface 908. Accordingly, hub 906 may exchange information with transaction terminals via terminal interface 1102 through the terminal interface tether 1104.

In the example of FIG. 11, hub 906 of electronic wallet device 1100 may provide a transaction token from transaction card 910 and/or transaction card 1110 to a transaction terminal via terminal interface 1102.

As indicated above, FIG. 11 is provided merely as an example. Other examples are possible and may differ from what was described with regard to FIG. 11.

Figure 12:
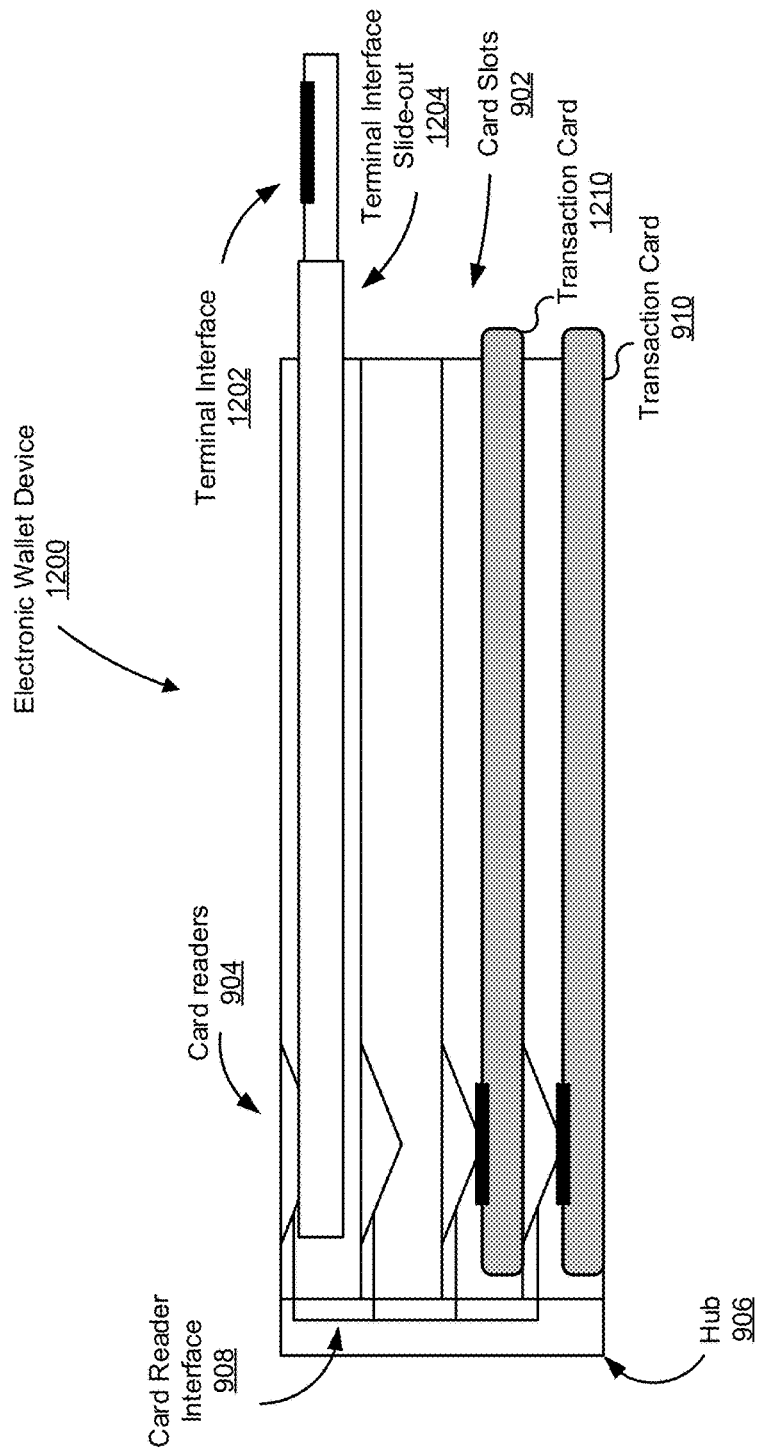

FIG. 12 is a diagram of an example implementation of an electronic wallet device 1200 described herein. Electronic wallet device 1200 may correspond to electronic wallet device 210 of FIG. 2. In FIG. 12, the reference numbers in common with FIG. 9 identify the same or similar elements. For example, electronic wallet device 1200 may include card slots 902, card readers 904, hub 906, card reader interface 908, and/or one or more features described above in connection with FIG. 9.

As shown in FIG. 12, electronic wallet device 1200 may include a terminal interface 1202 that may directly communicate with a transaction terminal (e.g., transaction terminal 230). For example, terminal interface 1202 may include a plurality of interfaces to interact with a transaction terminal, such as a magnetic strip, an IC chip, an RF antenna, and/or the like. Accordingly, terminal interface 1202 may be used in a similar manner as a terminal interface 1102 of FIG. 11.

As shown in FIG. 12, terminal interface 1202 is located on a terminal interface slide-out 1204. Terminal interface slide-out 1204 may be a mechanism that may be extendable for interaction with a transaction terminal and/or retractable into electronic wallet device 1200. In FIG. 12, the terminal interface slide-out may be communicatively coupled with card reader interface 908 such that hub 906 may obtain transaction information from transaction terminals and/or provide information or data (e.g., transaction tokens) from transaction cards inserted into electronic wallet device 1200.

In the example of FIG. 12, hub 906 of electronic wallet device 1200 may provide a transaction token from transaction card 910 and/or transaction card 1210 to a transaction terminal via terminal interface 1202.

As indicated above, FIG. 12 is provided merely as an example. Other examples are possible and may differ from what was described with regard to FIG. 12.

Accordingly, examples herein provide an electronic wallet device 210 that is capable of selecting a transaction card from a plurality of transaction cards of electronic wallet device 210 for a particular transaction. For example, the transaction card may be selected based on business information, transaction information, and/or based on card information (e.g. based on account information and/or based on rewards information) associated with the transaction card. As such, a consumer may utilize electronic wallet device 210 as described herein for an enhanced user experience when entering into transactions (e.g., the consumer does not have to sift through a plurality of cards, find the correct card for a transaction, or choose what is believed to be an optimal card for the transaction). Moreover, transaction failures may be avoided using electronic wallet device 210 as electronic wallet device 210 may not select or use business transaction cards for non-related business transactions that may be declined (e.g., by determining that a particular transaction may cause credit limits of the accounts of the transaction cards to be reached or exceeded) or non-business transaction cards for business transaction that may be non-refundable, thus saving consumer resources, monetary resources, and/or transaction terminal resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, and/or the like). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An electronic wallet device comprising:
   a plurality of card slots configured to hold at least two transaction cards,
      each card slot, of the plurality of card slots, including a card reader;
   one or more memories; and
   one or more processors, communicatively coupled to the one or more memories, to:
      receive transaction information associated with a transaction at a transaction terminal;
      identify business information associated with the transaction,
         the business information relating to whether the transaction is determined to be associated with a business-related expense associated with a user,
         the business information being obtained from a user device of the user,
         the business information including at least one of:
            calendar information associated with the transaction,
               the calendar information being associated with a business calendar of the user device,
               the business calendar indicating a business-related event,
               the business-related event being within a threshold time period of the transaction,
            message information associated with the transaction,
               the message information being analyzed, using artificial intelligence or machine learning, to indicate whether the message information is associated with a business transaction,
            authorization information associated with the transaction,
               the authorization information being associated with an application indicating allowable business transactions, or
            location information associated with the transaction,
               the location information relating to a location associated with a business transaction,
               the location being within a threshold distance of another location designated for business transactions;
      automatically select a transaction card from the at least two transaction cards received in respective slots of the plurality of card slots based on the transaction information and the business information; and
      provide a transaction token, associated with the selected transaction card, to be used in connection with the transaction terminal to process the transaction without removing the selected transaction card from a respective card slot.

2. The electronic wallet device of claim 1, where the calendar information comprises:
   a calendar event indicating that the transaction is associated with a business transaction, and
   where the one or more processors, when automatically selecting the transaction card, are to:
      automatically select, based on the calendar event, a business transaction card, from the at least two transaction cards, that is designated for the business transaction.

3. The electronic wallet device of claim 1, where the message information comprises:
   a message indicating that the transaction is associated with a business transaction, and
   where the one or more processors, when automatically selecting the transaction card, are to:
      automatically select, based on the message, a business transaction card, from the at least two transaction cards, that is designated for the business transaction.

4. The electronic wallet device of claim 1, where the authorization information comprises:
   authorized business transaction information indicating that the transaction is associated with a business transaction, and
   where the one or more processors, when automatically selecting the transaction card, are to:
      automatically select, based on the authorized business transaction information, a business transaction card, from the at least two transaction cards, that is designated for the business transaction.

5. The electronic wallet device of claim 1, where the one or more processors are further to:
   determine that the business information indicates that the transaction is not associated with a business transaction,
   where the one or more processors, when automatically selecting the transaction card, are to:
      automatically select the transaction card based on the business information indicating that the transaction is not associated with a business transaction.

6. The electronic wallet device of claim 1, where the transaction information comprises:
   a merchant identifier indicating a type of merchant that is associated with the transaction terminal, and
   where the one or more processors, when automatically selecting the transaction card, are to:
      automatically select the transaction card based on the business information indicating that the merchant identifier indicates that the transaction is associated with a business transaction.

7. The electronic wallet device of claim 1, where the user device is to obtain the business information via at least one of a calendar application, a messaging application, a location tracking system, or a business platform.

8. The electronic wallet device of claim 1, further comprising:
a user device interface, and
where the one or more processors, when receiving the business information, are to:
receive the business information from the user device via the user device interface of the electronic wallet device.

9. The electronic wallet device of claim 1, where the one or more processors are further to:
obtain business account information associated with the transaction card,
where, when automatically selecting the transaction card, the one or more processors are to:
automatically select the transaction card based on the business account information associated with the transaction card.

10. A non-transitory computer-readable medium storing instructions, the instructions comprising:
one or more instructions that, when executed by one or more processors of an electronic wallet device, cause the one or more processors to:
receive transaction information associated with a transaction at a transaction terminal;
identify business information associated with a time period of the transaction,
the business information relating to whether the transaction is determined to be associated with a business-related expense associated with a user,
the business information being obtained from a user device of the user,
the business information including at least one of:
calendar information associated with the transaction,
the calendar information being associated with a business calendar of the user device,
the business calendar indicating a business-related event,
the business-related event being within the time period of the transaction,
message information associated with the transaction,
the message information being analyzed, using artificial intelligence or machine learning, to indicate whether the message information is associated with a business transaction,
authorization information associated with the transaction,
the authorization information being associated with an application indicating allowable business transactions, or
location information associated with the transaction,
the location information relating to a location associated with a business transaction,
the location being within a threshold distance of another location designated for business transactions;
identify a set of candidate transaction cards to be used for the transaction,
the set of candidate transaction cards comprising respective integrated circuit (IC) chips that are communicatively coupled with a card reader of the electronic wallet device;
automatically select a transaction card from the set of candidate transaction cards that are communicatively coupled with the card reader of the electronic wallet device,
the transaction card being selected based on the business information; and
provide a transaction token, associated with the transaction card, to the transaction terminal without communicatively uncoupling the selected transaction card from the card reader of the electronic wallet device.

11. The non-transitory computer-readable medium of claim 10, where the one or more instructions, when executed by the one or more processors, further cause the one or more processors to:
identify a business transaction card in the set of candidate transaction cards,
the business transaction card for use in business transactions; and
determine, based on the business information and the transaction information, that the transaction is one of the business transactions,
where the one or more instructions, that cause the one or more processors to automatically select the transaction card, cause the one or more processors to:
automatically select the business transaction card based on determining that the transaction is the one of the business transactions.

12. The non-transitory computer-readable medium of claim 10, where the user device is in communication with the electronic wallet device.

13. The non-transitory computer-readable medium of claim 10, where the one or more instructions, that cause the one or more processors to identify the business information, cause the one or more processors to:
determine that the transaction is not associated with a business transaction,
where the one or more instructions, that cause the one or more processors to automatically select the transaction card, cause the one or more processors to:
automatically select the transaction card based on the transaction not being associated with the business transaction.

14. The non-transitory computer-readable medium of claim 10, where the transaction information comprises:
a merchant identifier indicating a type of merchant that is associated with the transaction terminal, and
where the one or more instructions, that cause the one or more processors to automatically select the transaction card, cause the one or more processors to:
automatically select the transaction card based on the transaction information indicating that the merchant identifier indicates that the transaction is associated with a business transaction.

15. A method, comprising:
detecting, by an electronic wallet device, a transaction pending at a transaction terminal,
the electronic wallet device holding at least two transaction cards,
the transaction being associated with transaction information;
obtaining, by the electronic wallet device, business information associated with a time period of the transaction, the business information relating to whether the transaction is determined to be associated with a business-related expense associated with a user, the business information being obtained from a user device of the user, the business information including at least one of:

calendar information associated with the transaction, the calendar information being associated with a business calendar of the user device, the business calendar indicating a business-related event, the business-related event being within the time period of the transaction, message information associated with the transaction, the message information being analyzed, using artificial intelligence or machine learning, to indicate whether the message information is associated with a business transaction, authorization information associated with the transaction, the authorization information being associated with an application indicating allowable business transactions, or location information associated with the transaction, the location information relating to a location associated with a business transaction, the location being within a threshold distance of another location designated for business transactions;

automatically selecting, by the electronic wallet device, a transaction card from the at least two transaction cards received in respective card slots of a plurality of card slots of the electronic wallet device, the transaction card being selected based on at least one of:

the business information, or transaction information associated with the transaction;

obtaining, by the electronic wallet device, a transaction token associated with the transaction card; and providing, by the electronic wallet device, the transaction token to the transaction terminal without removing the selected transaction card from a respective card slot of the plurality of card slots.

16. The method of claim 15, further comprising:

identifying the business information based on the time period, the business information being included within at least one of:

a calendar event, included in the calendar information, during the time period, or a message, included in the message information, indicating a time within the time period.

17. The method of claim 15, further comprising:

sending a request for the business information, to the user device, based on detecting the transaction pending at the transaction terminal, where the business information is to be received from the user device.

18. The method of claim 15, where obtaining the business information comprises:

obtaining the business information from at least one of:

the user device;

a user input of the electronic wallet device; or a cloud computing environment.

19. The electronic wallet device of claim 1, where the one or more processors, when automatically selecting the transaction card from the at least two transaction cards comprises:

calculating at least two scores for the at least two transaction cards, respectively; and automatically selecting the transaction card based on a score, of the at least two scores calculated for the transaction card, satisfying a threshold value.

20. The non-transitory computer-readable medium of claim 10, where the one or more instructions, that cause the one or more processors to automatically select a transaction card from the set of candidate transaction cards, cause the one or more processors to:

apply a set of weights for the transaction information and the business information, respectively; and automatically select the transaction card based on a weight, of the set of weights applied for the transaction card.

* * * * *